US007644087B2

(12) United States Patent
Barkai et al.

(10) Patent No.: US 7,644,087 B2
(45) Date of Patent: Jan. 5, 2010

(54) METHOD AND APPARATUS FOR DATA MANAGEMENT

(75) Inventors: Sharon Barkai, Shoham (IL); Gilad Zlotkin, Mevasseret Zion (IL); Avi Vigder, Petach-Tikva (IL); Nir Klar, Tel-Aviv (IL); Yaniv Romem, Jerusalem (IL); Ayelet Shomer, Yahud (IL); Iris Kaminer, Even-Yehuda (IL); Roni Levy, Herzlia (IL); Zeev Broude, Ramat-Gan (IL); Ilia Gilderman, Jerusalem (IL)

(73) Assignees: Xeround Systems Ltd., Yahud (IL); Xeround Systems Inc., Menlo Park, CA (US)

( * ) Notice: Subject to any disclaimer, the term of this patent is extended or adjusted under 35 U.S.C. 154(b) by 501 days.

(21) Appl. No.: 11/357,110

(22) Filed: Feb. 21, 2006

(65) Prior Publication Data

US 2006/0190243 A1 Aug. 24, 2006

Related U.S. Application Data

(60) Provisional application No. 60/655,441, filed on Feb. 24, 2005, provisional application No. 60/733,768, filed on Nov. 7, 2005.

(51) Int. Cl.
*G06F 17/30* (2006.01)

(52) U.S. Cl. ............................. 707/10; 707/3; 707/205; 709/224; 709/225; 711/173

(58) Field of Classification Search ....................... None
See application file for complete search history.

(56) References Cited

U.S. PATENT DOCUMENTS

| 5,675,791 | A  | * | 10/1997 | Bhide et al. | 707/205 |
| 6,128,467 | A  |   | 10/2000 | Rege et al. | |
| 6,594,698 | B1 | * | 7/2003  | Chow et al. | 709/226 |
| 6,640,244 | B1 | * | 10/2003 | Bowman-Amuah | 709/207 |
| 2006/0168214 | A1 | * | 7/2006 | Armstrong et al. | 709/225 |
| 2007/0067435 | A1 | * | 3/2007 | Landis et al. | 709/224 |

OTHER PUBLICATIONS

Garcia-Molina "Elections in A Distributed Computing System", IEEE Transactions on Computers, 31(1): 47-59, 1982.
Valduriez "Parallel Database Systems: The Case for Shared-Something", Proceedings of the International Conference on Data Engineering, IEEE Computer Society Press, Conf.9: 460-465, 1993.

* cited by examiner

*Primary Examiner*—Jean M Corrielus
*Assistant Examiner*—Loan T Nguyen

(57) ABSTRACT

A data access system decouples the data processing from the data storage to provide improved accessibility, integrity, scalability and other features. The system comprises: database units arranged in virtual partitions each independently accessible, a plurality of data processing units, and a switching network for switching the data processing units between the virtual partitions, thereby to assign data processing capacity dynamically to respective virtual partitions.

43 Claims, 18 Drawing Sheets
(14 of 18 Drawing Sheet(s) Filed in Color)

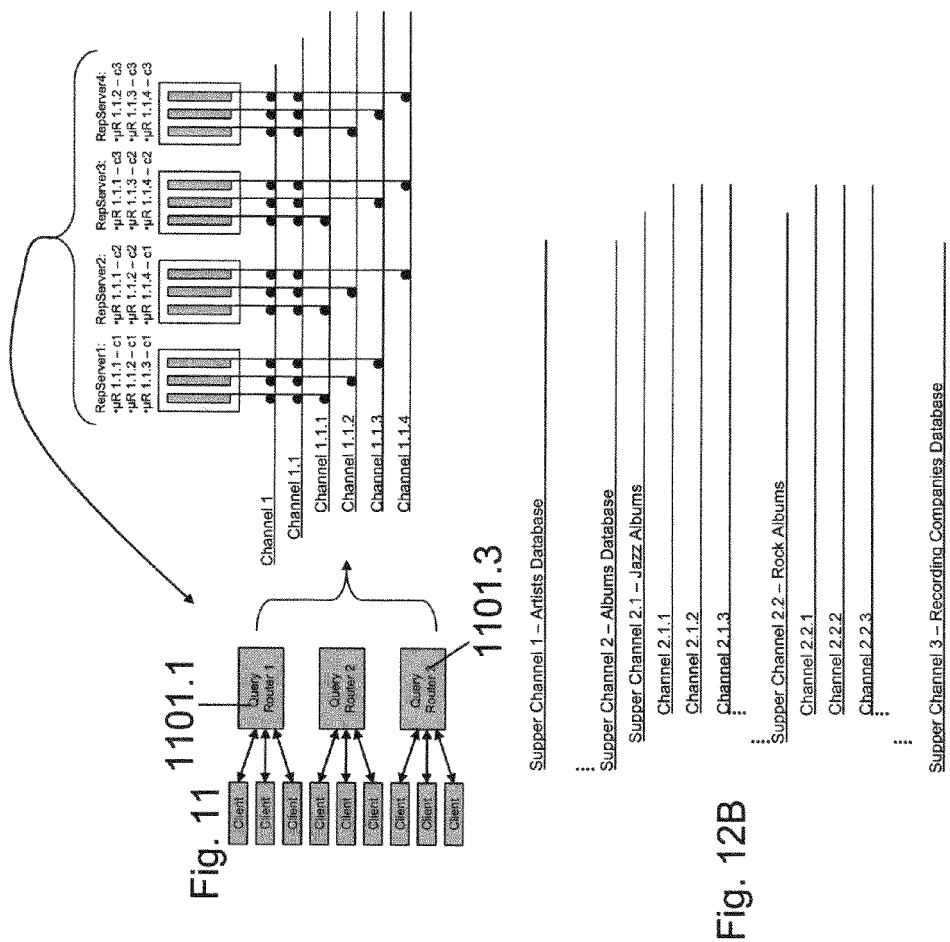

METHOD AND APPARATUS FOR DATA MANAGEMENT

RELATED APPLICATIONS

The present application claims priority from U.S. Provisional Patent Application No. 60/655,441, filed on Feb. 24, 2005, and U.S. Provisional Patent Application No. 60/733,768, filed on Nov. 7, 2005, the contents of which are herein incorporated by reference.

FIELD AND BACKGROUND OF THE INVENTION

The present invention relates to a method or apparatus for data management and, more particularly, but not exclusively to such a method or apparatus that uses a distributed architecture.

Distributed Data Repository

Most mission critical data repositories are built as distributed systems that run on several computing servers interconnected by a data network—i.e. Distributed Data Repositories. Examples for distributed data repositories are: File Systems, Directories and Databases. Mission-critical data repositories are built as distributed systems mainly to provide high availability and high scalability.

1. High availability is provided such that, no single computing server failure compromises the availability of the data repository as a whole including each and every data element.

2. High scalability is provided in two different dimensions: (1) amount of data, and (2) read/write transaction rate (throughput). In either case, a distributed data repository is "Highly Scalable" if more computing servers can be added to the system to support more amounts of data and/or higher transaction rate. Scalability of mission critical distributed data repositories will also require "Online Scalability", which means the system can scale while continuing to provide data management services.

Real-Time Event Processing

When distributed data repositories serve data applications that perform real-time event processing, then distributed data repositories are also expected to support high responsiveness.

3. High Responsiveness is provided for real time data repositories such that each read and each write transaction is guaranteed with very high probability to be completed within a pre-defined amount of time. In real-time data repositories, the high availability and the online scalability requirements are also expected to preserve the continuous high responsiveness of the system during failures and during scalability events.

Examples of real-time event processing data applications are: Telecom call-control, Mobile telephony Home Location Registrar (HLR), Internet Multimedia System's (IMS) Home Subscriber Server (HSS), Online Banking and Trading Systems.

Mission critical real-time data repository systems are expected to be highly available, highly scalable and highly responsive. Supporting the combination of these requirements is very challenging. The responsiveness requirement may suggest allocating and devoting a dedicated computing resource for a transaction to make sure it is completed within the required amount of time. This strategy makes typical pipeline and timesharing processing scheduling less effective for accelerating the transaction rate, as responsiveness may be adversely affected.

The high availability requirement, on the other side, would typically suggest storing every mission critical data item on highly available storage device (e.g. RAID—Redundant Array of Independent Disks), which means that every write transaction needs to be written into the disk before it is committed and completed. Otherwise, the data will not be available in case the writing computing element has failed. This strategy reduces the transaction rate achieved even when running on large computing servers with many CPUs (SMPs—Symmetrical Multi-Processing).

In many cases, mission critical data repositories are accessed by several different computing entities ("clients") simultaneously for read/write transactions and therefore distributed data repositories also need to provide system-wide consistency. A data repository is considered to be "consistent" (or "sequential consistent"), if from the point of view of each and every client, the sequence of changes in each data element value is the same.

In most implementations of distributed data repositories supporting many concurrent clients that perform write transactions, the consistency requirement is also a limiting factor for system scalability in terms of transaction rate. This is because write transactions need to be serialized and read transaction typically have to be delayed until pending write transactions have been completed. The serialization of read/write transactions is typically done also when different transactions access different data elements (i.e. independent transactions), due to the way the data is organized within the system (e.g. on the same disk, in the same memory, etc.).

"Shared All" Distributed Cache Coherency Architectures

Traditional distributed data repositories (such as Oracle Real Application Clustering and others) use highly available storage (typically using RAID technology) to store mission critical data while maintaining coherent local caches of in memory copies of data. This "shared all" distributed cache coherency architecture is capable of providing flexible active-active N+M high availability such that all computing nodes can be utilized to share all the data processing load. In case of one or more node failures the surviving nodes can be utilized to take over the data processing handled by the failed nodes.

The "shared all" distributed cache coherency architecture is illustrated in FIG. 1. The architecture is capable of providing scalability of read transaction rate, i.e. adding more nodes to the system can increase the read transaction rate. However, "shared all" distributed cache coherency architectures typically suffer from no or even negative write transaction rate scalability due to the need to coordinate each write between all local caches. Therefore, as more nodes are added to the system, it takes longer to commit and complete each write transaction, such that cache coherency is maintained between all local caches. This growing delay in committing and completing a write transaction makes the "shared all" distributed cache coherency architecture unsuitable for supporting applications that require real-time transaction processing when a big portion of the transactions are write transactions. The responsiveness requirements cannot be met when there is a large write transaction rate, and this becomes problematic because it is common that real-time event processing applications mentioned above have high write transactions rates. Therefore, the "shared all" distributed cache coherency architecture is not suitable for such applications when deployed in large scale.

"Shared Nothing" Data Partitioning Architecture

Other distributed data repositories (such as IBM DB2 UDB and MySQL) use a "shared nothing" data partitioning architecture such as that illustrated in FIG. 2. In the shared nothing architecture, a distributed data repository system is partitioned to several independent distributed data repository subsystems, and each manages a different part of the data. In the "shared nothing" data partitioning architecture, each partition can be viewed as a "shared all" distributed cache coherency sub-system, each with its own highly available storage.

The "shared nothing" data partitioning architecture overcomes the write rate scalability problem, since the more independent partitions the system has, the more independent writes transactions can be performed concurrently to different partitions in a non-blocking way. Therefore, the write commit responsiveness can also be well addressed by such an architecture.

The key for the "shared nothing" data partitioning architecture is that the computing resource partitioning is tightly coupled to the data partitioning. This means that, computing resources are statically assigned to each data partition. When the system write rate grows, then the only way to scale the system up is to re-partition the system to more partitions and allocate more computing resources to the new partitions. This scaling process would typically require re-distributing data between partitions and cannot be done without harming the system's ability to continue providing highly responsive online database service. Therefore, re-partitioning would typically require planned down-time of the whole system. Therefore, online scalability cannot be achieved in a "shared nothing" data partitioning architecture. Moreover, to fully utilize the potential concurrency of the "shared nothing" architecture, the client application would typically need to be aware of the way data is being partitioned, which means that repartitioning events may also require changes in the client application itself. This makes the "shared nothing" architecture very expensive to manage and maintain.

"In-Memory" Data Repository Architecture

Other data repository architectures have emerged to focus on reducing transaction latency to provide better responsiveness and also to provide overall better transaction rate. This is done by keeping all the data in one sufficiently big memory of a single machine and by performing all database operations directly inside this memory. The latency of accessing the computer working memory may be orders of magnitude shorter than accessing storage devices such as disks. Therefore, by managing all data in memory, the data repository gains much shorter transaction latency and, therefore, also higher transaction rate.

Mission critical in-memory data repositories have typically duplicated the system to two or more identical instances, such that in-memory data is continuously synchronized between the duplicate instances via the local network (as in the cache coherency mechanisms of the "shared all" architecture). Network based data commit increases the latency of completing write transactions and therefore, also decreases the write transaction rate. However, network based data synchronization enables fault tolerance.

As a variation of the above it is possible to provide two or more data repositories for redundancy, with updating between the repositories.

Reference is made to FIG. 3, which illustrates an in-memory repository with fault tolerance.

In-memory data repositories cannot scale beyond the capacity and the write transaction rate provided by a single computing server. The only way to scale the capacity and/or the write transaction rate of an "in-memory" data repository system is to add more memory to the computing system, or in the case that the memory capacity of the computing system is maxed out, move the system to a larger computing system with more memory and more CPUs (i.e. larger SMP server). Both scalability strategies would require planned down-time of the system and therefore not comply with the high-availability and online-scalability requirements. Neither capacity nor write transaction rate can be scaled just by adding more computing server.

In-memory data repositories typically require co-location of the application and the database to achieve maximum performance and low latency. This raises the actual cost of the database, as they are typically priced per CPU, but the CPU is not dedicated only to the database, but also to the application. Therefore, a real application that consumes CPU and memory resources significantly reduces the actual price performance of the database. On the other hand, separating the in-memory database and the application to separate boxes, which allows maximum utilization of the money spent on the database, often reduces the performance gained by using an in-memory database to begin with.

There is thus a widely recognized need for, and it would be highly advantageous to have, a system that combines the advantages and avoids the disadvantages of the above described systems.

SUMMARY OF THE INVENTION

According to one aspect of the present invention there is provided a data access system comprising:

database units arranged in virtual partitions each independently accessible, a plurality of data processing units, and a switching network (that combines one or more interconnected switching units) for switching the data processing units between the virtual partitions thereby to assign data processing capacity dynamically to respective virtual partitions.

Preferably, each database unit is independently accessible as a respective network channel.

The system may comprise a hashing unit for carrying out a hashing process on data and wherein data is assigned to respective database units via a result of the hashing process.

Preferably, data is assigned in the form of a collection of one or more tables. Preferably, each table is assigned in the form of a collection of records having a primary key and/or one or more secondary keys. The hashing process is carried out on one of the keys, herein the leading key of the table. The leading key for a table can be any key, including a composite key, meaning more than one field and/or a non-unique key and/or a foreign key.

Preferably, data is assigned in the form of records having a leading key and possibly one or more secondary keys and wherein each record is assigned a primary address, a "primary hash," based on the leading key and possibly also one or more secondary addresses, referred to as a secondary hash, based on the secondary keys.

Two or more tables can share the same leading key. Typically such a leading key may also be a foreign key, but this is not essential. As a result, the primary hashed address remains the same for all records from different tables that share the same primary key. The records can therefore also be managed as a single data entity when needed.

Two or more tables can also share one or more secondary keys and therefore records from different tables can also share secondary hashed addresses.

The system may comprise a resolution unit for resolving secondary addresses into corresponding primary addresses.

Preferably, the resolution unit comprises at least one router. Backup routers may also be provided, to ensure high availability of the system. Just a single backup router is sufficient to ensure that after the failure of one router, the remaining routers can still handle secondary address to primary address resolution, so that data elements continue to be available using secondary addresses.

Secondary key resolution, i.e. routing, can also be made by having the system maintain an internal index table that maps secondary key to one or more primary keys, depending on whether the secondary key is unique or not. This internal index table is hashed across all virtual partitions using the secondary key as the leading key of the index table. In such a case, routing secondary key to primary key is done by reading the index table, in the same way as any other table is read.

The system may be configured such that every virtual partition is stored and managed by several data processing units, such that, after the failure of a data processing unit, the system can still provide access to all data.

Preferably, each virtual data partition has an odd number of copies. The odd number ensures that majority voting between the versions generally works. Preferably, all data processing, including write and read operations, are carried out by a majority based group decision, and the system can continue to provide uninterrupted accessibility to the data, even when a minority of the copies of each virtual partition are lost, say due to the failure of some data processing units. The maximal size of the minority is the level of fault tolerance of the system. For example, if the system has 5 copies for each virtual data partition, then the system can lose up to 2 copies of each virtual data partition without losing majority voting for each read and write transaction. Thus up to two copies may be lost without losing the accessibility of each data element in the system.

The system may comprise election functionality for dynamically assigning for each virtual partition, one of the data processing units as a leader or coordinator to arbitrate between conflicting and concurrent write operations.

The system may comprise election functionality for dynamically assigning virtual partitions to data processing units.

The system may include a self-healing mechanism that is triggered after the first data processing unit failure, such that missing copies of virtual data partitions are reassigned to all or some of the remaining data processing units. As a result the fault tolerance of the system tends back to its target level.

Five nines (99.999%) of availability is the typical requirement of carrier grade systems. Now, for a large system, it is typically sufficient to have three copies of each data record or virtual partition, assuming that each of the underlying data processing units themselves have a 99.9% availability and that the self-healing mechanism is triggered within a few minutes. For extra availability, that is beyond the five nines level and/or for mega large system it is sufficient to have five copies. Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates the prior art share-all with distributed cache coherency architecture;

FIG. 2 illustrates the prior art share nothing architecture where data is partitioned to different data nodes and each partition is managed as a shared all with distributed cache coherency;

FIG. 3 illustrates the prior art fault tolerant in memory data repository architecture where all the data is kept in memory and fully replicated and synchronized between two or more memories of different computing units;

Figure 1:
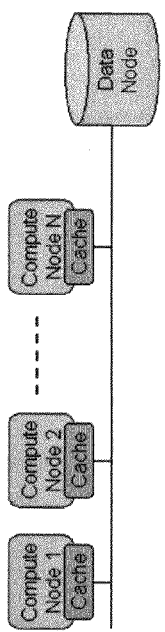
Figure 2:
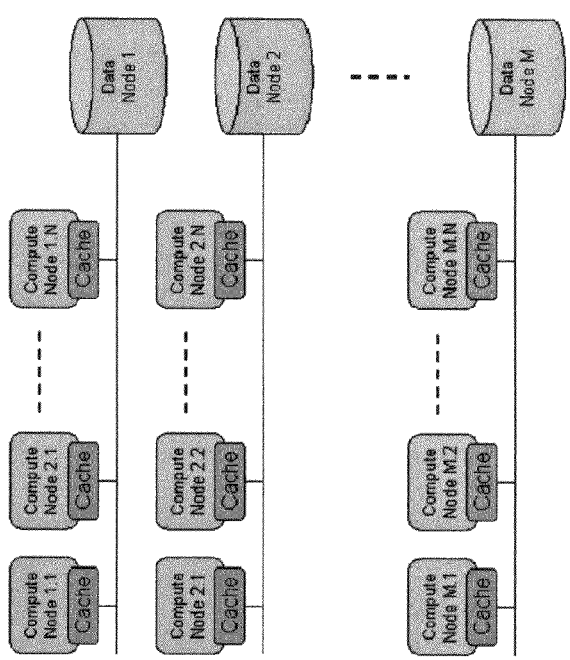
Figure 3:
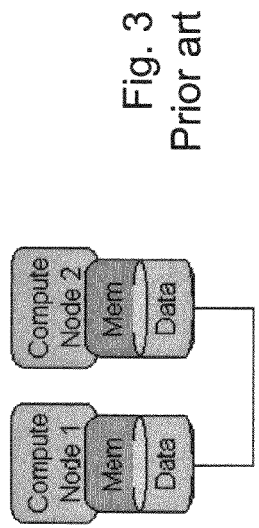
Figure 4:
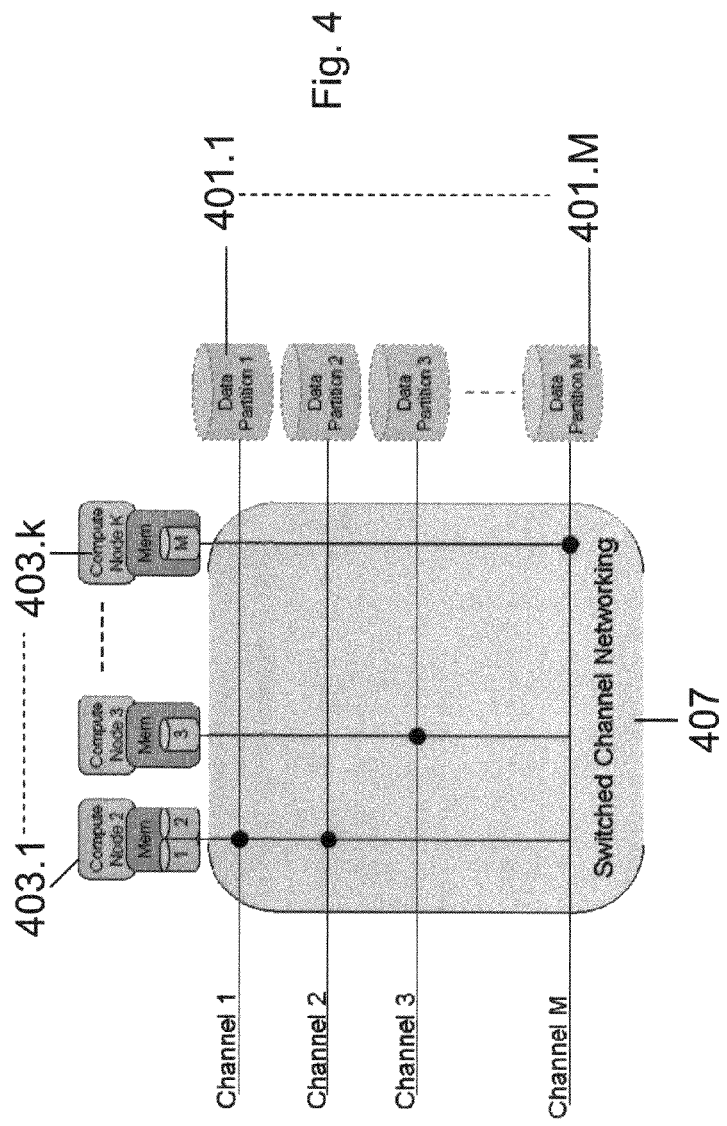
Figure 5:
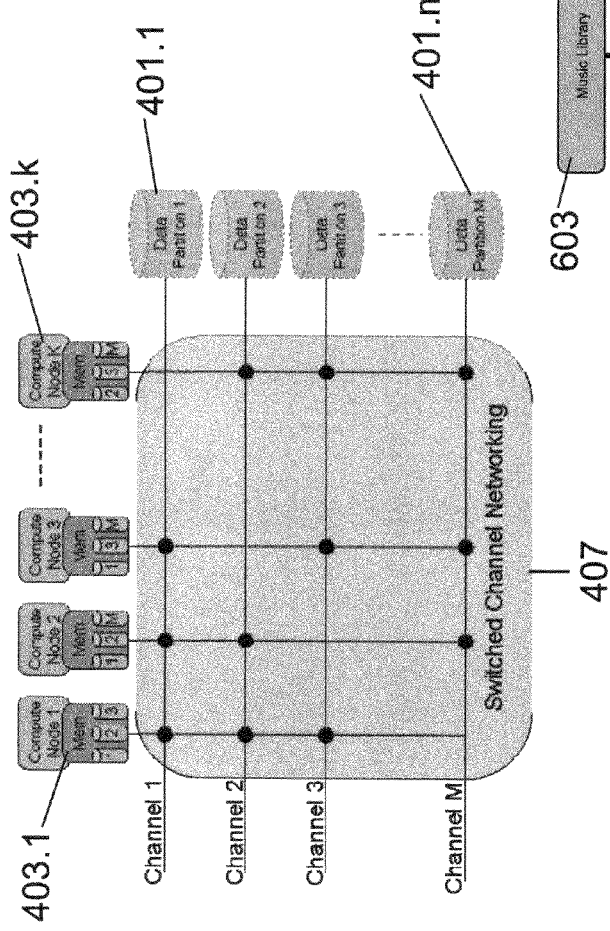
Figure 6:
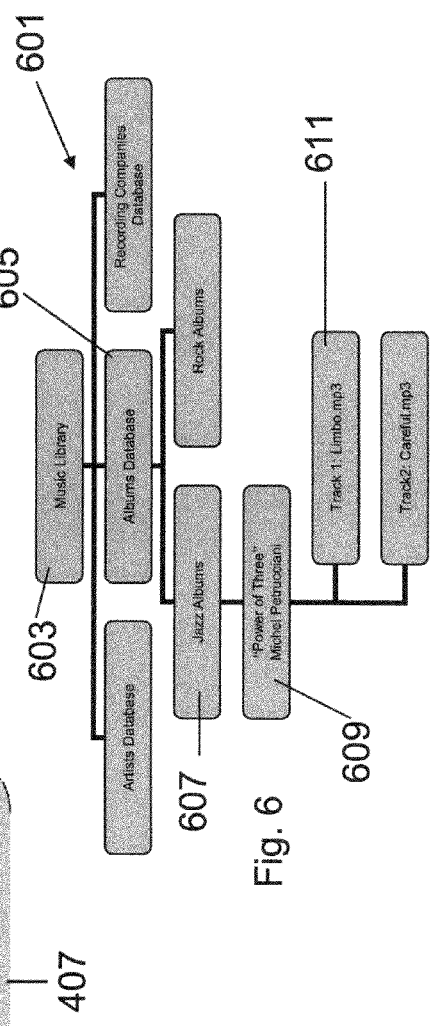
Figure 7:
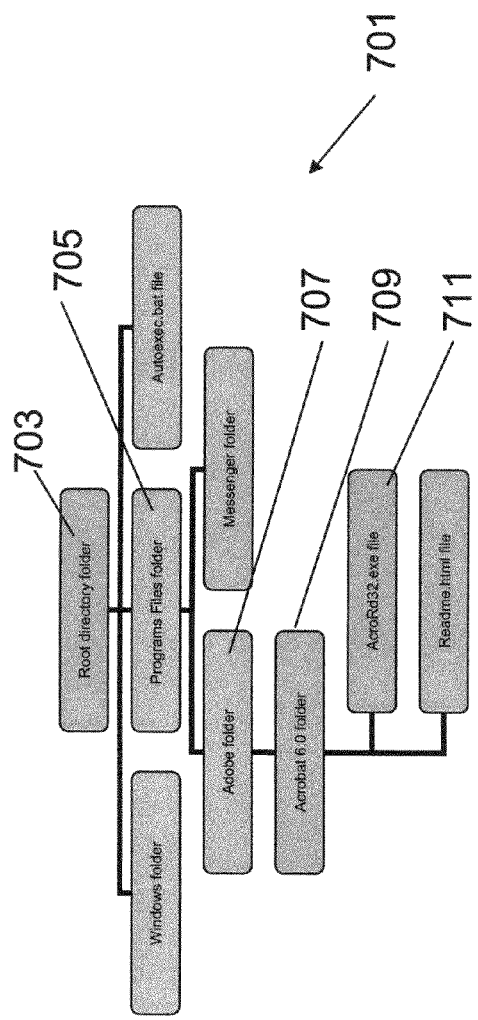
Figure 8:
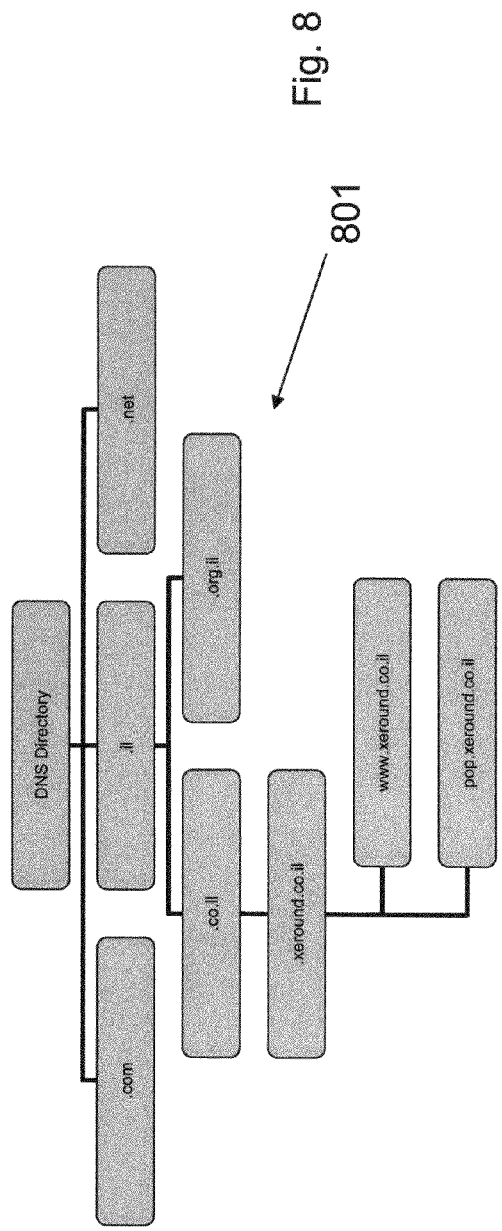
Figure 9:
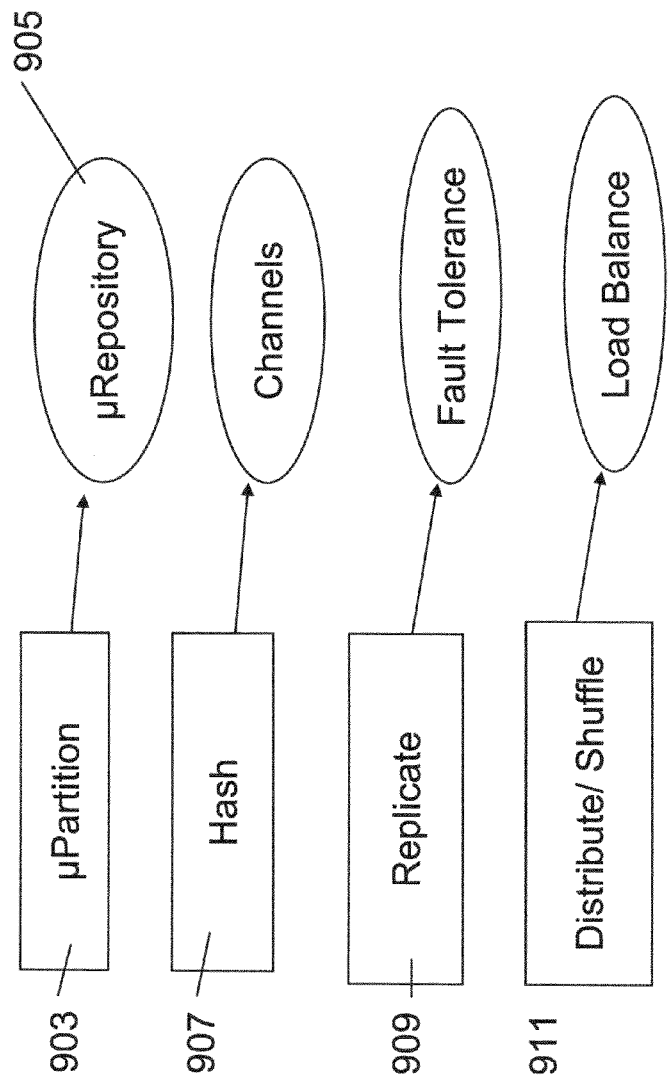
Figure 10A:
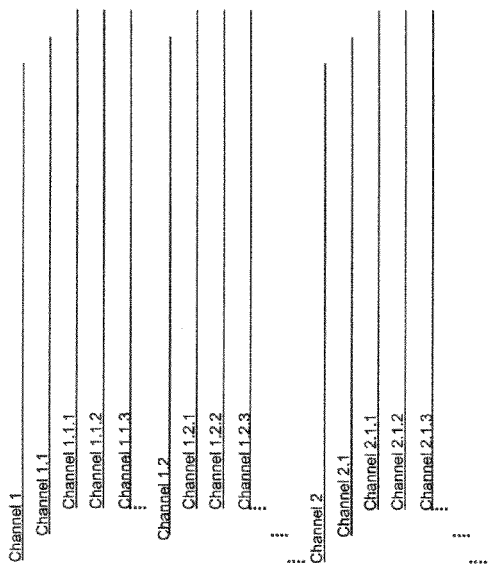
Figure 10B:
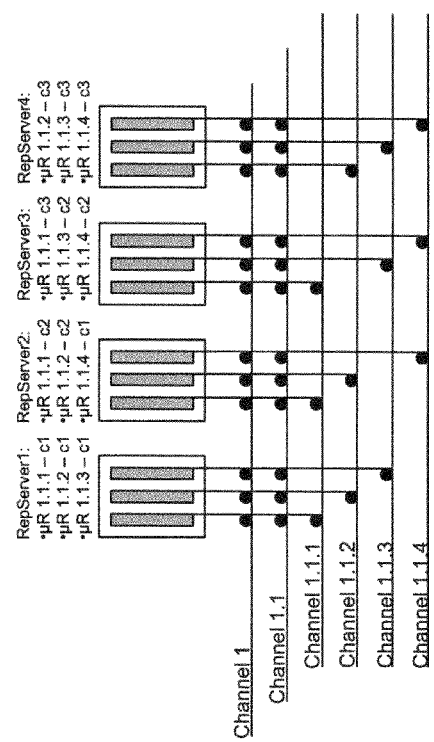
Figure 12A:
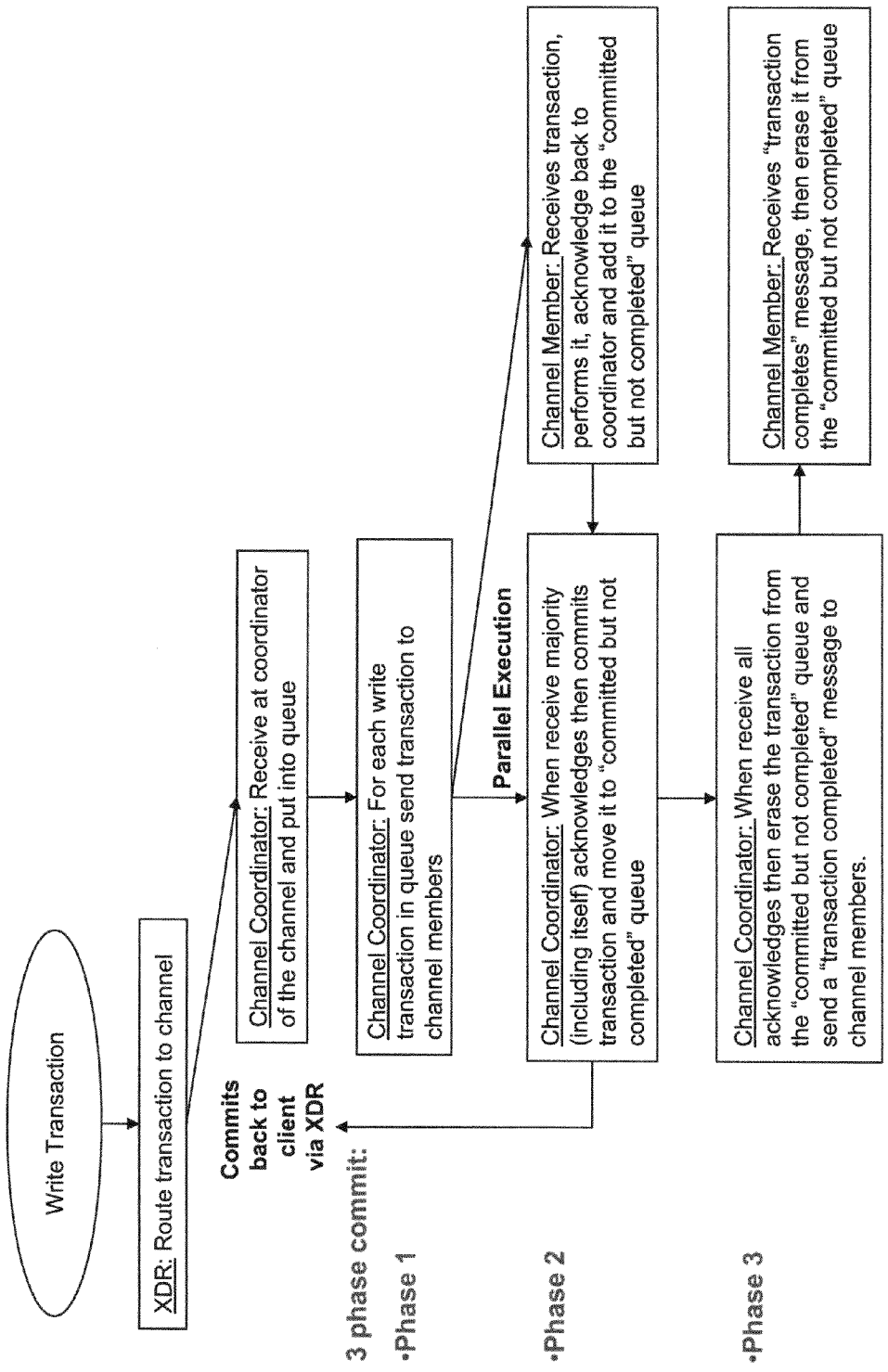
Figure 12C:
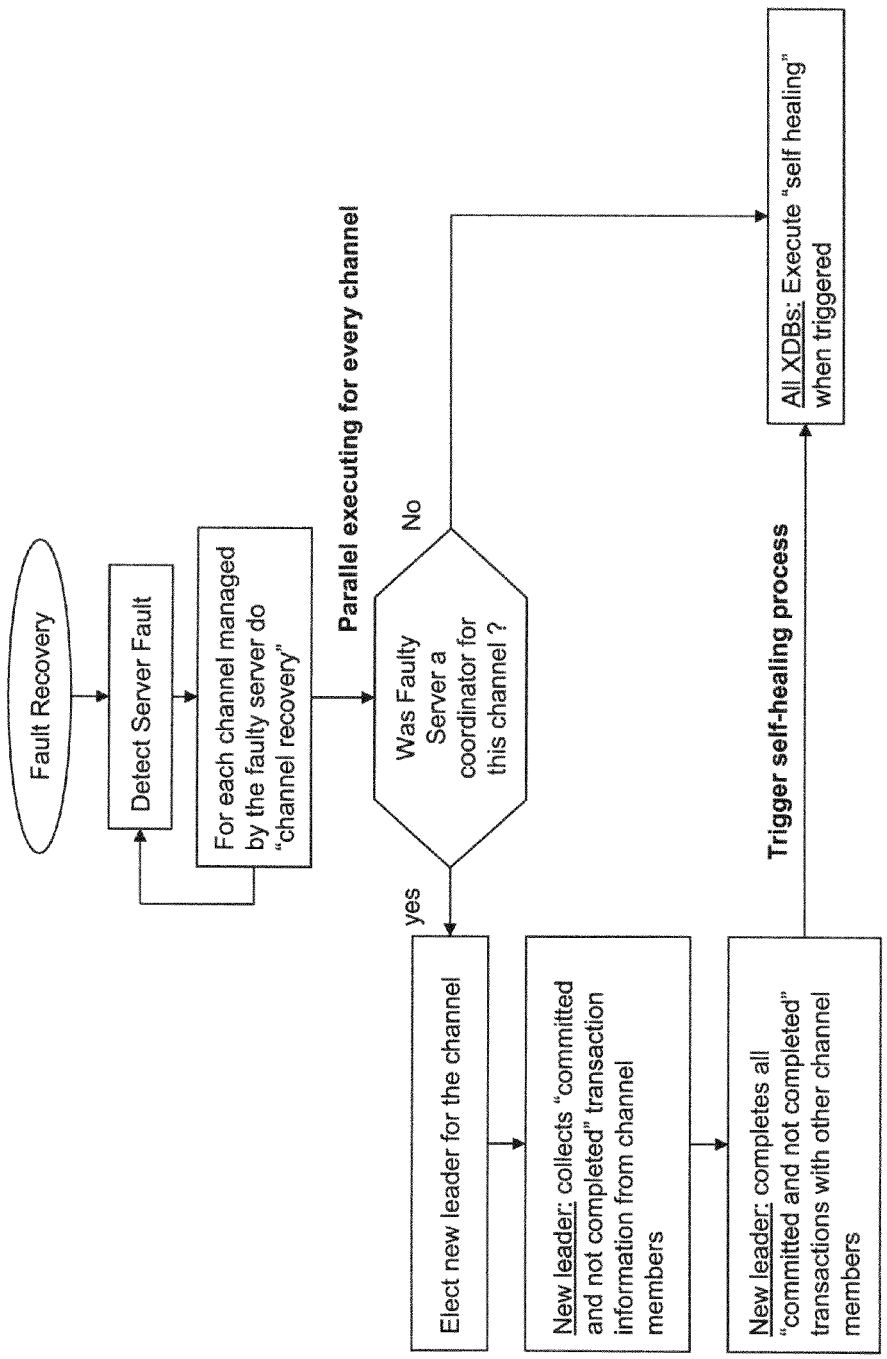
Figure 12D:
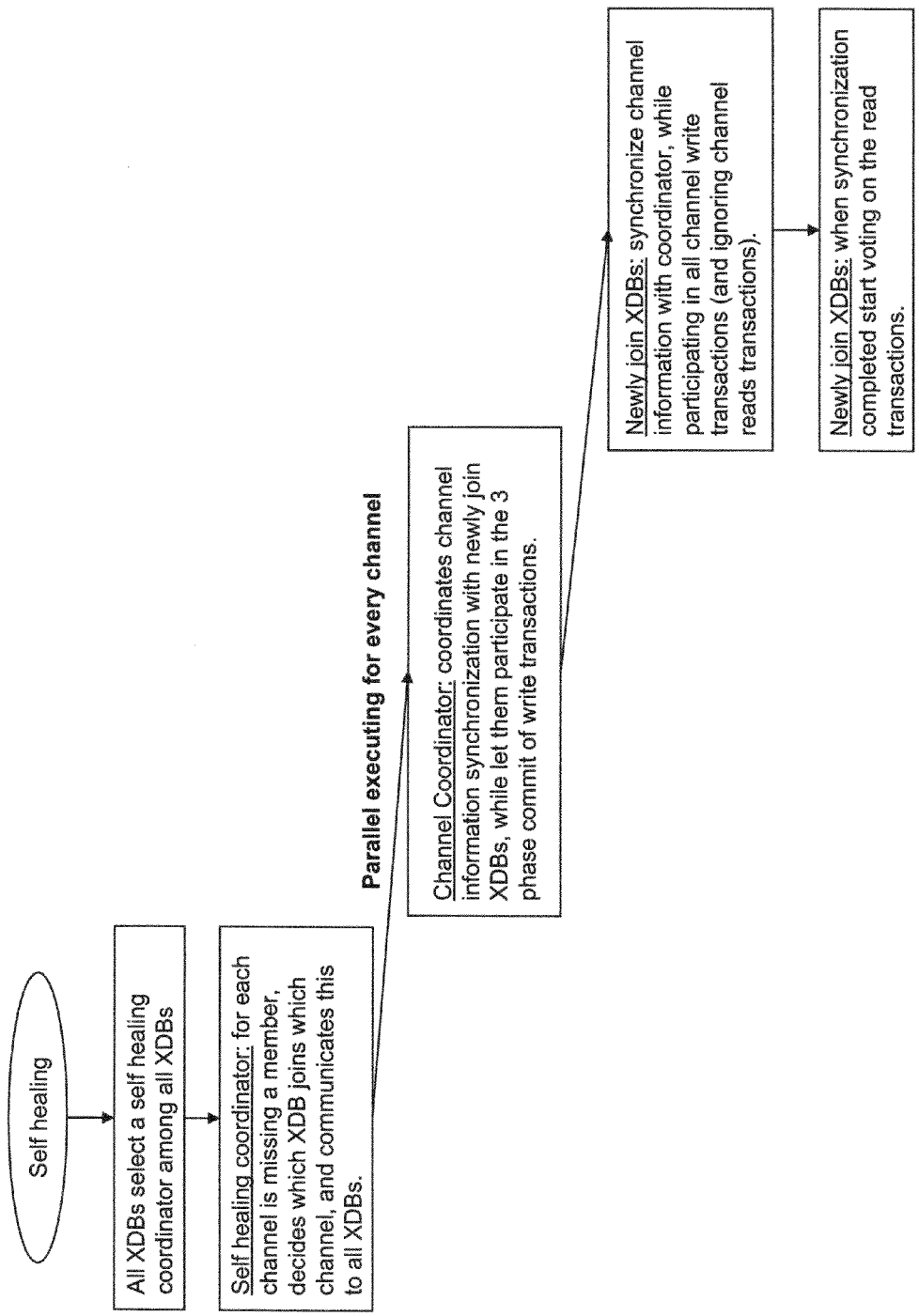
Figure 14:
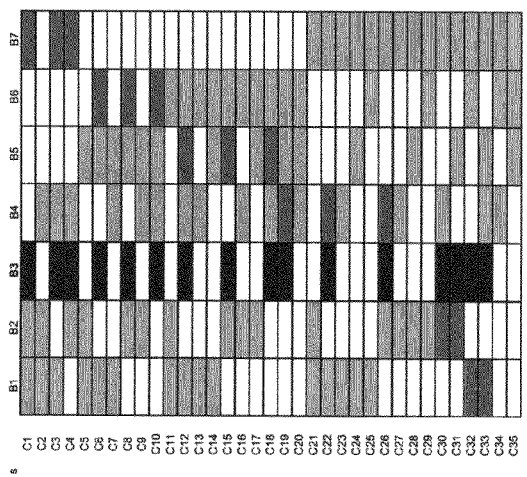
Figure 13:
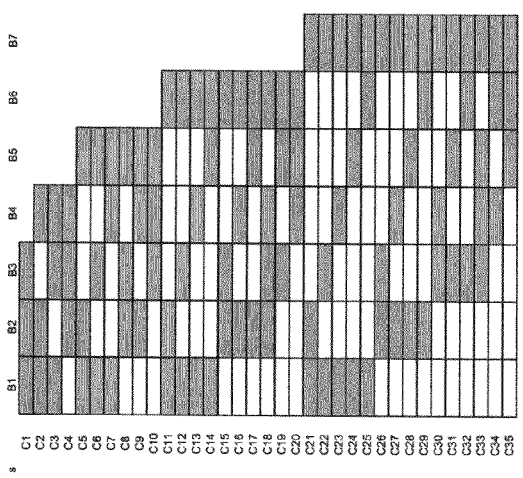
Figure 15:
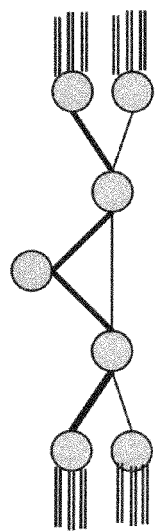
Figure 16:
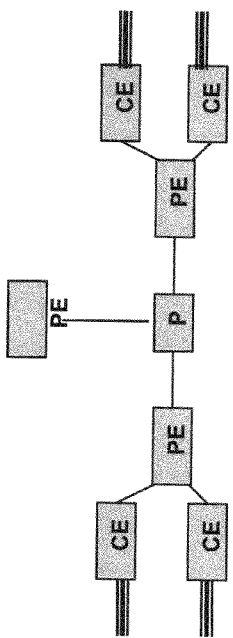
Figure 17:
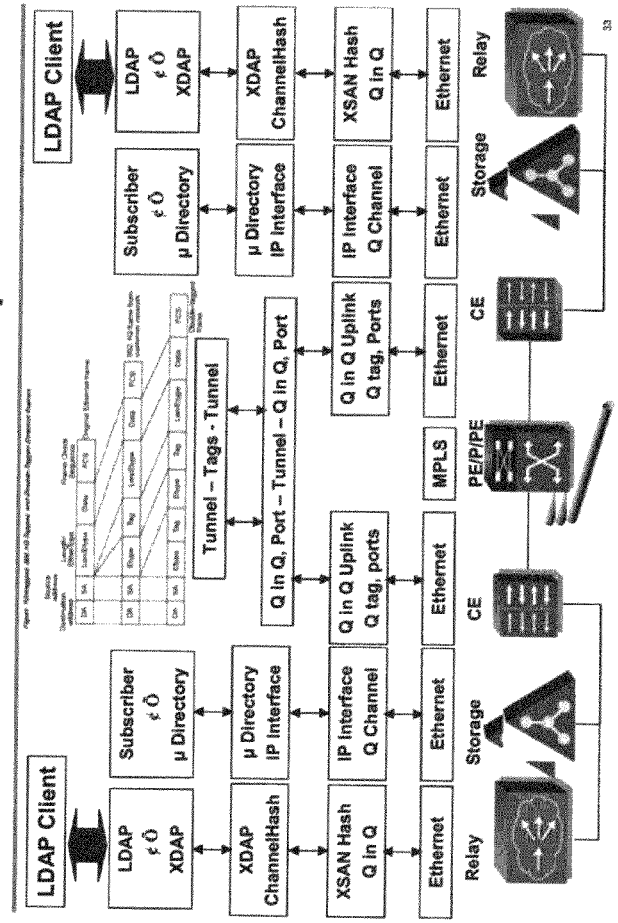
Figure 18:
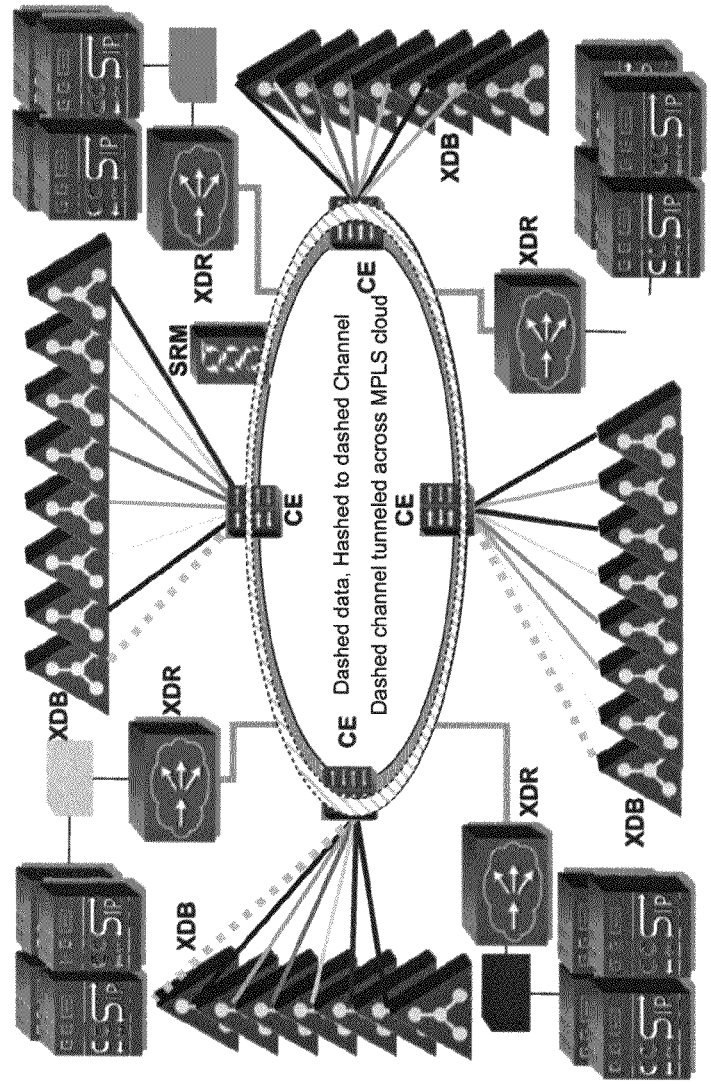
Figure 19:
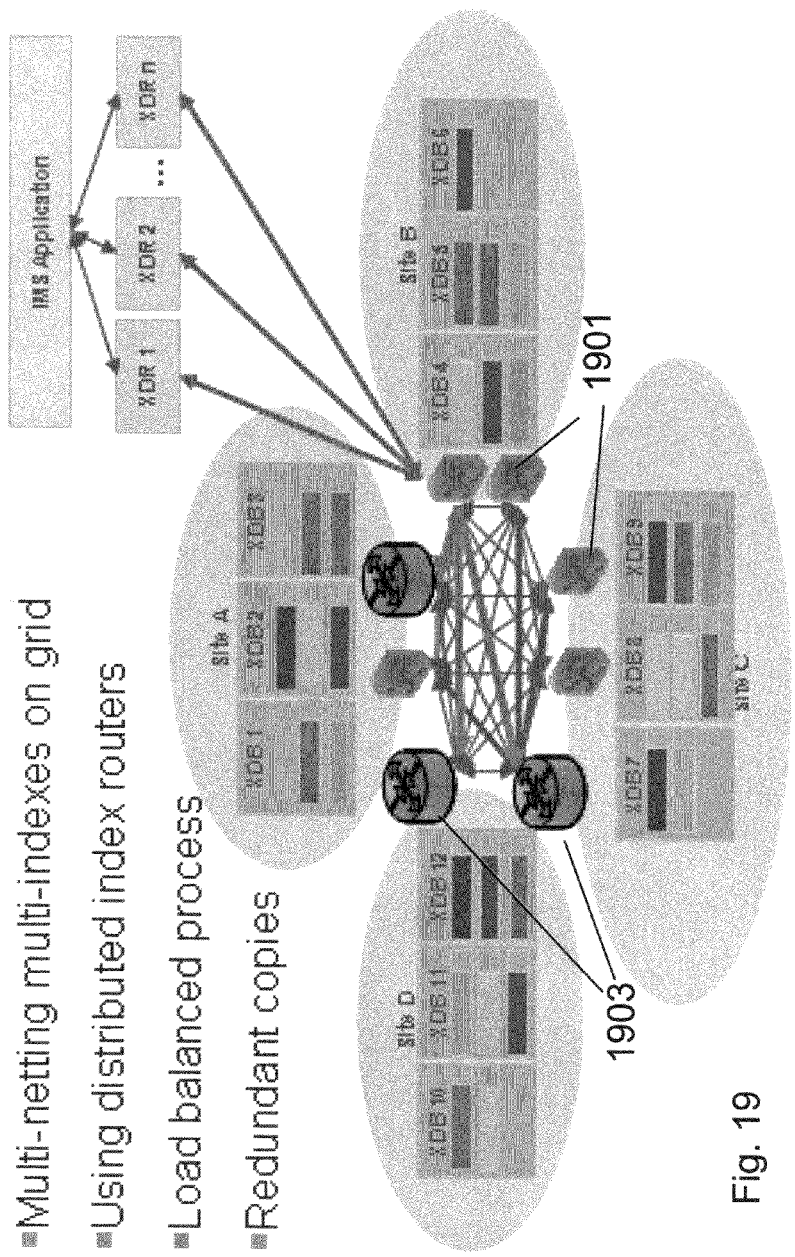
Figure 20A:
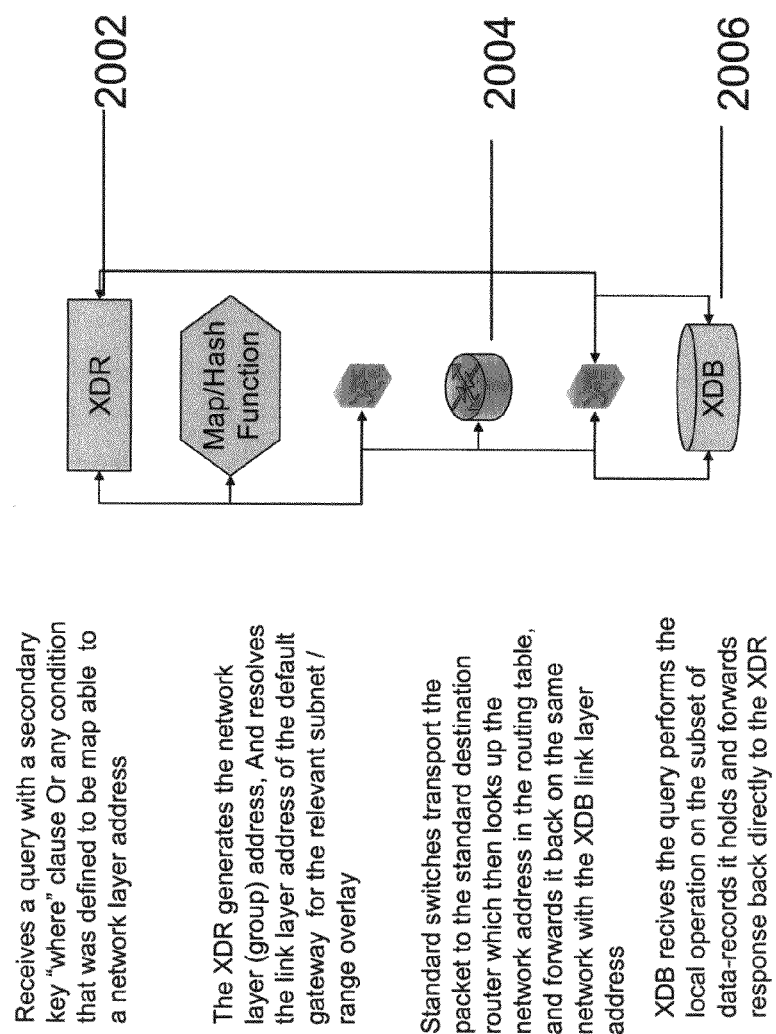
Figure 20B:
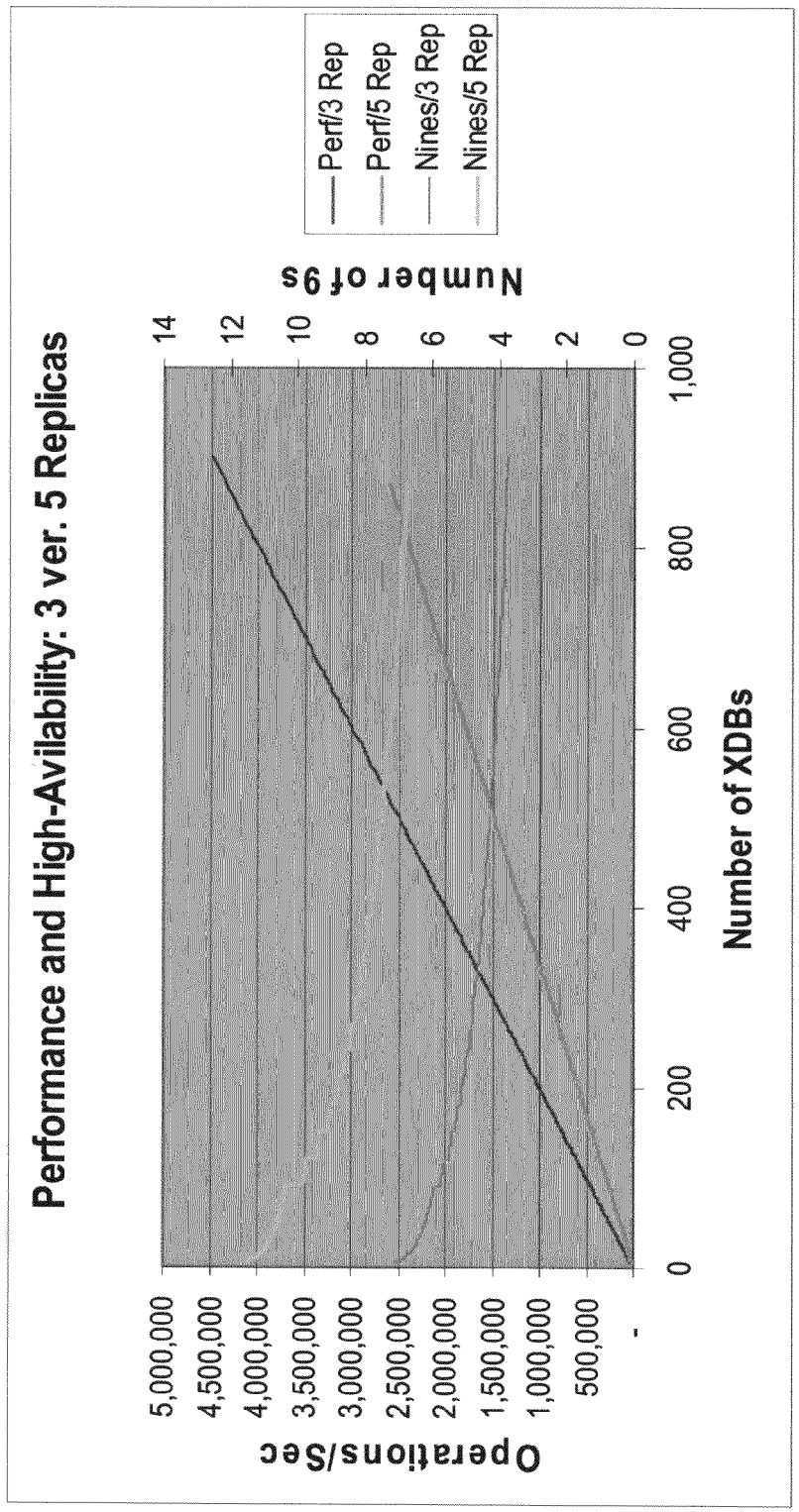
Figure 21:
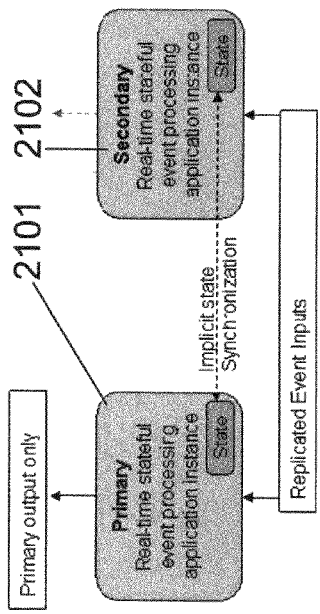
Figure 22:
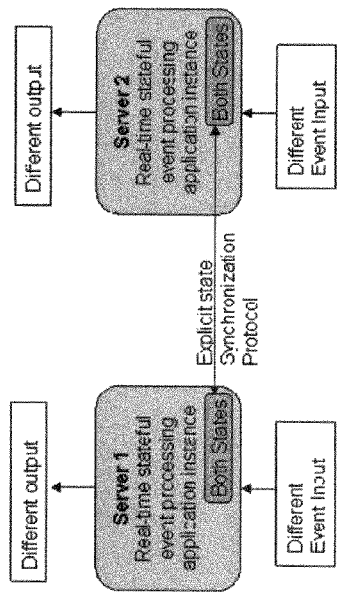
Figure 23:
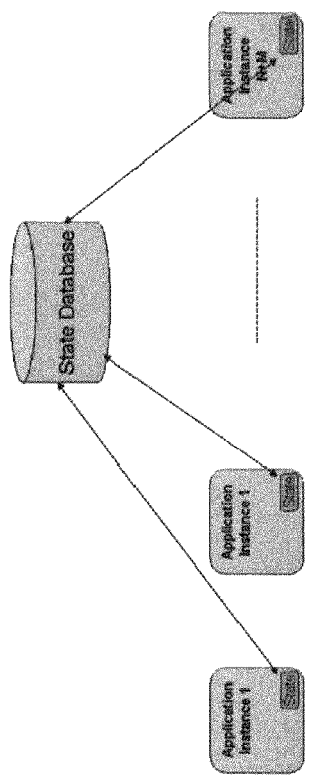
Figure 24:
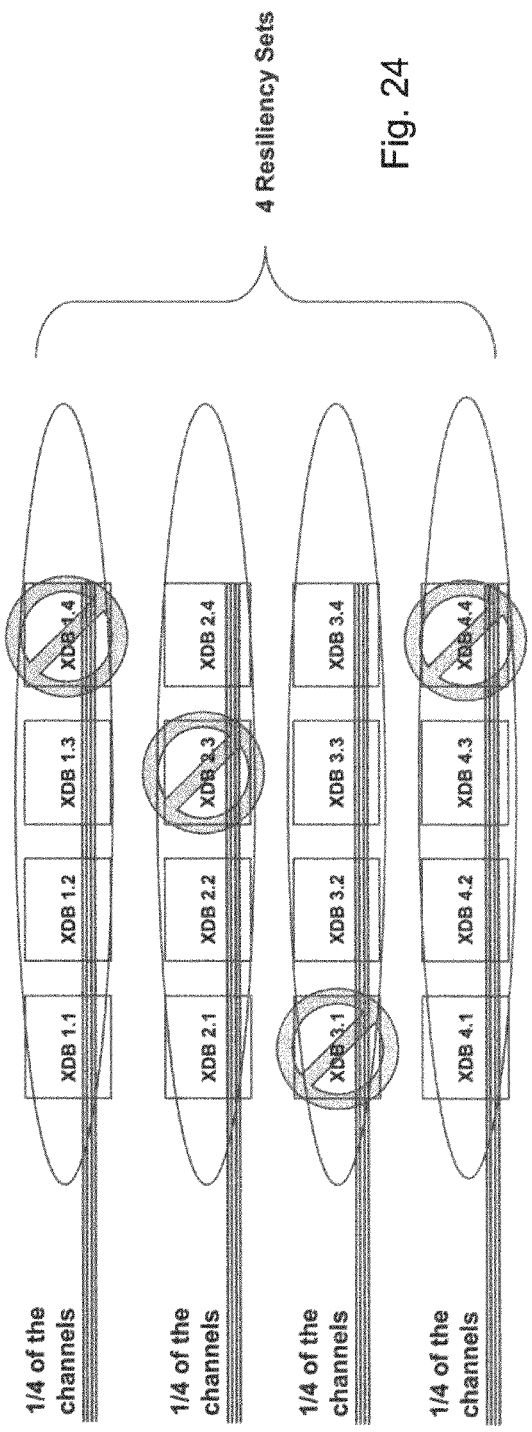

FIG. 4 is a simplified diagram illustrating an architecture according to a preferred embodiment of present invention where switch channel networking is used to dynamically map between virtual partitions and computing units. In this simplified case, virtual partitions are not replicated and there may be a one to many relationship between computing units and virtual partitions, such that each computing unit stores and manages a single copy of one or more virtual data partitions;

FIG. 5 is a simplified diagram showing the architecture of FIG. 4, but this time with data replications, such that there are many-to-many relationships between computing units and data replications: each computing unit stores and manages one or more virtual data partitions and each data partition is stored and managed by 3 computing units;

FIGS. 6-8 show tree structures for data organizations in hierarchies which can be represented using hierarchy-based virtual partitions according to a preferred embodiment of the present invention;

FIG. 9 is a simplified flow chart illustrating a partitioning procedure according to a preferred embodiment of the present invention;

FIGS. 10A and 10B illustrate channels having two levels of sub-channels and further show the assignment of micro-repositories within the channel hierarchy according to a preferred embodiment of the present invention;

FIGS. 11 and 12B are simplified block diagrams showing parts of the architecture of FIG. 4, where virtual partitions are hierarchy based according to a preferred embodiment of the present invention;

FIG. 12A is a simplified flow chart illustrating a 3 phase commit write operation using a preferred embodiment of the present invention;

FIG. 12C illustrates a simplified flow chart of a fault recovery operation according to a preferred embodiment of the present invention;

FIG. 12D illustrates a simplified flow chart of a self-healing operation according to a preferred embodiment of the present invention;

FIGS. 13 and 14 are block diagrams of remapping of servers and microrepositories of data as part of the self-healing mechanism, according to a preferred embodiment of the present invention;

FIG. 15 is a channel switched network graph and multicast spanning tree, according to a preferred embodiment of the present invention;

FIG. 16 is a block diagram of part of a network according to a preferred embodiment of the present invention and showing customer equipment;

FIGS. 17 and 18 are block diagrams showing distributed channel hash implementations according to a preferred embodiment of the present invention;

FIGS. 19 and 20A are a block diagram and flow chart respectively illustrating how mapping of the data can be carried out using a secondary key, according to a preferred embodiment of the present invention;

FIG. 20B is a graph showing performance and availability in terms of operations per second against number of data storage units XDBs for cases of 3 and 5 copy storage and two different availability levels;

FIGS. 21 and 22 are block diagrams illustrating how process states can be maintained according to a preferred embodiment of the present invention;

FIG. 23 is a block diagram illustrating the use of a state database for the maintenance of process states according to a preferred embodiment of the present invention; and FIG. 24 is a simplified diagram showing a preferred embodiment of the present invention in which channels are switched in groups.

DESCRIPTION OF THE PREFERRED EMBODIMENTS

The present embodiments comprise an apparatus and a method for building a distributed data repository using multicast domains networking. The data repository of the present embodiments comprises decoupling of the data partitioning from the computing resource partitioning. The advantage of such an architecture is that it provides guaranteed responsiveness, high availability, high scalability and dynamic online scalability. A system similar to the share nothing architecture is provided, but instead of physical partitions, virtual partitioning is used by mapping data to network channels which are a kind of group address. Network channels are then dynamically mapped to computing resources by using switched network addressing management and routing. The result provides, decoupling of the data partitioning from assignment of computing resources. Data processing is disconnected from the data storage and the number of virtual channels that can be provided is limited only by the network addressing space. Data processing resources can be reassigned at will.

In an embodiment, the addressing space used to search the data may contain multiple addresses for a single data record allowing the data to be located using either primary key, a secondary key or additional keys.

The embodiments described below describe an "in-network" data repository architecture. The architecture defines the building of a distributed data repository system that combines the benefits of "shared all", "shared nothing" and "in-memory" over a distributed architecture, while avoiding the drawbacks of each solution, as will be described in greater detail hereinbelow. The architecture has the responsiveness of the above-described "in-memory" architecture. At the same time the "in-network" architecture has symmetric load balancing, and the N+M high availability of the above-described "shared all" architecture, but without blocking element that would limit the scalability and responsiveness of the system.

In addition, the "in-network" architecture described herein has the non-blocking data partitioning attribute of the above-described "shared nothing" architecture. However there is no need either to do explicit data partitioning or to do explicit computing resource allocation between different data partitions, and therefore the system may achieve truly high responsive, dynamic load balancing between computing elements, as will be explained hereinbelow.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 4 which is a schematic illustration of a first preferred embodiment of the present invention. The data access system comprises database units arranged in virtual partitions each independently accessible, and a plurality of data processing units. There is further provided a switching unit for switching said data processing units between said virtual partitions thereby to assign data processing capacity dynamically to respective virtual partitions. More particularly, in FIG. 4, data partitions 401.1 . . . 401.M are mapped onto channels 1 . . . M. Computer nodes 403.1 to 403.K, each comprise memory and are connected via switches of switching matrix 407 to the channels so that a grid-type network is set up.

FIG. 4 illustrates an architecture in which switch channel networking is used to dynamically map between virtual partitions and computing units. In this simplified case, virtual partitions are not replicated and there may be a one to many relationship between computing units and virtual partitions, so that each computing unit stores and manages a single copy of one or more virtual data partitions.

The distributed data repository architecture shown in FIG. 4 organizes the data and processing power in such a way that it is non-blocking and therefore maximizes the concurrency of serving independent read/write transactions in memory, while providing a relatively high level of responsiveness, consistency, and relatively easy scalability.

The above-described advantages are achieved by:

1. Decoupling the data partitioning from the computing resource partitioning. The result is achieving "shared nothing" non-blocking concurrency in a way that combines "shared all" zero-management scalability.

2. Managing data in-memory, thereby achieving the "in-memory" architecture referred to above.

Decoupling data partitions and computing resource partitions is done by using switched channel networking and creating an intermediate networking structure referred to herein as channels, such that data partitioning is statically mapped to the network channels while computing resources can be dynamically assigned to those networking channels. Hence each computing server that is assigned to one or more channels maintains all the data partitions that are mapped to its channels in its memory.

The mapping between computing servers and channels does not need to be one-to-many, it can also be many-to-many. Hence several computing servers can be assigned to the same channel such that data partition is replicated in memory and synchronized between all computing servers that are assigned to the same channel.

Reference is now made to FIG. 5, which shows the embodiment of FIG. 4 in slightly more detail to illustrate the decoupling of data from computing partitions with replications. Parts that are the same as in FIG. 4 are given the same reference numerals and are not referred to again except as necessary for an understanding of the same embodiment. Switched channel networking allows any of the data partitions to be connected to any of the computer nodes dynamically as necessary.

FIG. 5 has the same basic architecture as FIG. 4, but differs in that there are provided data replications. The data replications allow for many-to-many relationships between computing units and data replications. Each computing unit stores and manages one or more virtual data partitions and each data partition is stored and managed by say 3 or 5 computing units.

The following elements comprise the embodiment of FIG. 5:

Decoupling the data partition from the computing partition by using an intermediate networking channel and implementing independent dual mapping through the switched channel networking:

a. One-to-One static mapping of data partitions 401.1-401.*m* to base networking channels channel 1 . . . channel M.

b. Many-to-Many dynamic mapping of computing servers 403.1 . . . 403.*k* to channels, channel 1 . . . channel M.

2. Networking channeling methods are provided to leverage standard packet networking so as to ensure wire speed responsiveness and real-time reconfiguration of channel assignment.

3. A distributed data management protocol herein the data access protocol or XDAP 4. Data indexing using routed networking, as well as partitioned index table handling, ensures wire speed access to the same data via alternative secondary indexes.

The distributed data repository architecture shown in FIG. 5 organizes the data and processing power in such a way that it is non-blocking and therefore maximizes the concurrency of serving independent read/write transactions in memory, without compromising the responsiveness levels, consistency, scalability and availability levels.

The advantages described above are achieved by:

decoupling the data partition from computing resource partitioning, achieving "shared nothing" non-blocking concurrency with "shared all" transparent scalability, and managing data partitioning in-memory replicated across the network, achieving "in-memory" responsiveness and fault tolerance.

Further aspects of the invention are now illustrated by way of a description of hierarchical data partitioning that is applicable to most data repositories. The present invention is applicable to numerous data types, including but not limited to those mentioned. Following the description of the data types is a description of how hierarchical data partition can be decoupled from the computing partitioning using publish-subscribe networking channels, and then there is a discussion of how such "published subscribed" networking channels can be implemented using standard packet networking.

After the channel implementation is described the core distributed data management protocol (XDAP), referred to above, that ensures wire speed data synchronization, transaction integrity, fault tolerance, online scalability and self healing.

There follows a description of indexing method that leverages standard routed networking, as well as, index table partitioning handling.

Data Partitioning Hierarchies

Reference is now made to FIG. 6, which illustrates a tree-type data hierarchy 601. Data elements within data repositories are usually partitioned to hierarchies in a tree-like structure that represents a "part of" relationship or a full order relationship. For example, a relational database is organized in schemas. Each schema is organized in tables. Each table has a list of records that have different key values.

The "part of" ($\supset$) relation well defined relations in such hierarchy. In the example above: "Music Library" 603 $\supset$ "Albums Database" 605 $\supset$ "Jazz Albums" 607 $\supset$ "Power of Three" 609 $\supset$ "Limbo.mp3" 611.

Another example file system is illustrated in FIG. 7. The example of FIG. 7 shows a directory system 701 organized as a hierarchy of folders. Within the hierarchy, each folder contains other folders and/or files. Each file contains a list of blocks.

The "part of" ($\supset$) relation is also well defined in the file systems example above: "Root directory folder" 703 $\supset$ "Programs Files folder" 705 $\supset$ "Adobe folder" 707 $\supset$ "Acrobat 6.0 folder" 709 $\supset$ "AcroRd32.exe file" 711.

Reference is now made to FIG. 8, which illustrates a yet further example of a tree structure. In FIG. 8, directories are also built as a tree 801 of lists, while each element in the list is ether a data record or a list of data records.

In tree 801, data is organized in hierarchies, and thus each data element has a unique "coordinate" within the data repository, e.g. "DNS Directory" $\supset$ ".il" $\supset$ ".co.il" $\supset$ ".xeround.co.il" $\supset$ "www.xeround.co.il".

A data element's coordinates uniquely identify the element and therefore are always provided as part of a write transaction. In many cases, specific data coordinates are also provided in read transactions. For example to resolve the IP address of www.xeround.co.il domain name, a specific coordinate will be provided within the directory query. However, some read queries may refer to upper levels in the hierarchy, for example "all domain names in .co.il". In this case the query "selects" a sub-tree to read information from.

An embodiment described hereinbelow teaches a method of organizing data and processing resources within data repositories using a hierarchy-based hash function that maps all data elements into a hierarchy of network channels that constitute the back-bone of a distributed data repository that supports all kinds of queries while providing responsiveness, data consistency, transaction integrity, very high scalability, dynamic online scalability and high availability.

Decoupling the Data Partition from the Computing Partition

The distributed hierarchy-based hash data repository built up includes a hierarchy of multicast network channels, such that different queries can be routed to different channels and, on the other hand, different computing servers can subscribe to any set of channel to receive all their messages. Hereinbelow are enumerated different standard networking technologies that can be used to implement such a publish-subscribed networking channels mechanism.

Returning now to FIG. 4 and within the channels themselves is defined an order "≧" that means "in the same or sub channel." i.e. Channel 1≧Channel1.1≧Channel 1.1.1 while Channel 1.1≧Channel 1.2 and Channel 1.2≧Channel 1.1

The decoupling is illustrated in the flow chart of FIG. 9 and consists of the following components:

Micro (μ) Partitioning 903: The global data repository is statically and virtually partitioned to many independent micro-repositories (μRepository 905), each subscribed to a different set of channels. The number of microrepositories can be in the thousands or even more.

Hashing 907: A monotonic hierarchy-based hash function is used on the data repository coordinates to map them to channels. Hash function h( ) is monotonic when: a ⊃ b=>h(a)≧h(b). The solution uses perfect hash functions (i.e. homogenous distribution among target channels), to maximize concurrency. The hash function actually partitions the global data repository to many independent μRepositories.

Replicating 909: Each μRepository is triplicate (or even five or more copies) to identical and independent copies. All copies of the same μRepository are subscribed to the same set of channels. As will be discussed in more detail below, the majority principle is used for query results for transaction integrity, data consistency and high availability.

Distributing and Shuffling 911: μRepositories copies are aggregated to computing servers. Each μRepository is a single process, thread, table or sub-table on a computing server. Therefore, each computing server is subscribed to the channels of its μRepositories. μRepositories are well distributed and shuffled between computing servers to maximize load balancing and minimize interdependencies and blocking.

Reference is now made to FIG. 10A, which is a conceptual diagram showing a series of channels divided into sub-channels. Thus channel 1 is divided into channel 1.1 and channel 1.2. Channel 1.1 is in turn divided into sub-channels 1.1.1, 1.1.2 and 1.1.3.

Reference is now made to FIG. 10B which shows microrepositories assigned to the channels and sub-channels. An example of applying the replication and shuffling principles can be seen in that each μRepository that is subscribed to a sub-channel, is also subscribed to all channel levels above that channel.

Networking Channeling Publish-Subscribe Methods

Networking channels are provided herein as publish-subscribe mechanisms such that each server can publish i.e. send messages on any channel. However, only servers that are pre-subscribed to a channel get to read the messages that are being published on the channel. Any server can dynamically subscribe and/or un-subscribe to/from any channel any time. A given server can be subscribed to many channels at the same time.

Several methods for implementing such networking "publish subscribe" channels using standard packet networking are described hereinbelow.

Distributed Data Access and Management Protocol XDAP

Referring back to FIG. 9 and coordinate hashing 807 is carried out in a distributed computing component referred to as a "Query Router" (or XDR-Data Router) Reference is now made to FIG. 11, which illustrates a network architecture using query routers 1101.1 . . . 1101.3. Each query router processes a plurality of queries simultaneously. There can be as many Query Routers as needed in the solution to support all the data repository clients, which generate read/write queries/transactions. Each client is preconfigured to work against one or more specific query routers. The query router represents the data repository to his clients, such that it receives a read/write query, performs the query, and then returns back to the client the result value or status of the query.

The query router uses the following general algorithm to process a query:

It uses the coordinates of the query, formed from leading or secondary keys to hash and route the query to the right channel. It is noted that every server can write to any channel. However, only servers that are subscribed to a channel receive its messages. The Read transaction processing is different from the Write (Insert, Update, Delete) transaction processing. A query router may transform a single query into several read transactions, write transactions and locking actions. The query router generates such a query execution plan or access plan and then executes each such transaction as described below. Locking actions are performed as commonly known and used in the database domain.

Read Transaction: A read transaction that is based on the leading key is done in one phase, a "switching phase" in which the read request is switched to the right channel, following which the procedure waits for the μRepositories that are subscribed to that channel, to independently calculate the read query against their own internal data repository, and send their results back to the requesting data router. After receiving sufficient information from the μRepositories regarding the read query result, the data router integrates the information, calculates the query and sends the results back to the client.

A read transaction that is based on a secondary key is performed by having a routing phase before the switching phase. The routing phase comprises mapping the secondary key to a primary key that is then used in the switching phase as described above. A routing phase can be achieved by using routers, or this can also be done by performing a read transaction against the right secondary index table. The secondary index table maps secondary keys to leading keys of the original table. Therefore, the leading key of the index table is the secondary key of the original table and such index read transaction is done as with any leading key based transaction in one switching phase as described above. When the routing phase is implemented by network routers, then the XDR uses another hash faction that maps the secondary key to a unique network address that the read transaction is sent to. The router now receives a message to redirect the query, or route the query to the right channel such that from the XDR point of view as well a secondary key based read transaction requires a single phase.

Write Transaction: The write transaction is received by all servers that are subscribed to the given channel. However, the distributed commit process of the write transaction is managed by a special coordinator that is elected among the members of the given channel using a 3 phase commit protocol. Once the 3 phase commit is completed, under the management of the coordinator, the coordinator reports back to the XDR with a write transaction completion indication, which is then forwarded to the client. The coordinator is needed since simultaneous access to the same data record from different sources is allowed, and yet data integrity has to be maintained in the event of simultaneous write attempts.

The reader is referred to the section regarding majority based leader election hereinbelow for further details regarding selection of the coordinator.

The processing of write queries and read queries while providing non-blocking concurrent processing, sequential consistency, transaction integrity and fail tolerance is now discussed in greater detail.

Write Transaction Processing

Reference is now made to FIG. 12A, which is a simplified flow chart showing the write transaction. A write Transaction can include Insert, Modify or Delete transactions. The Insert Transaction always specifies the full coordinate "C" of a specific data record to add it, i.e. the leading key. However, Delete and Modify transactions may not provide the leading key. They may provide secondary key values or some other search criteria. In the case that the leading key is not specified as part of the write transaction, then th XDR needs to perform a read transaction first of all that find all records that need to be modified or deleted and then performs the write transaction with the leading key value in hand. The description of FIG. 12A herein assumes that the leading key for the write transaction was already identified. To ensure that the write operation has been completed successfully in all copies it performs a 3-phase commit protocol with all μRepository copies. The commit protocol is coordinated by one of the servers, that is elected to be the coordinator, as mentioned above.

More particularly, for each channel, a coordinator is elected. The coordinator initiates committing of any transaction. The coordinator serializes dependent transactions. Concurrent reads, meaning read accesses that occur during the write accesses typically complete using the version of the record prior to an update, or alternatively they wait for the version after the update. Reads can also be made to fail in the event that they are performed during an update if the application so requires. Also, once the write has been committed (and a response sent to the query router), no new read receives the former version as a response.

The coordinator preferably uses a monotonic counter to mark each transaction it initiates on each channel. The first phase of a 3 phase commit is to send the transaction to all participants. The coordinator thus sends the transaction to all participants. The next step is to collect their pre-commit or abort responses. Atomic transactions are maintained through a single coordinator, and the members of the channel always work in complete synchronization with regards to each transaction. Therefore, the responses must always be the same (either pre-commit or abort in the three phase commit terminology). Due the complete synchronization, the channel members can immediately locally commit the transaction when the response is pre-commit (i.e. there is some merging of the protocol phases). Upon receipt of a majority of acknowledgements (pre-commit or abort), the coordinator may respond to the query router with the appropriate response.

To enable recovery in case of failure of the coordinator during the course of a write operation, all members keep the transaction information. To maintain the totally synchronized trait of the channel members, the coordinator continues to retransmit the transaction to all members until they have all acknowledged. The need for repetitive retransmissions, say following lack of acknowledgement, indicates a failure in the channel and the channel may have to be reorganized to reflect the failure. Once there is consensus on the transaction and what may have gone wrong, it can be cleaned up, as majority voting over the channel members can lead to a consensus and thus recovery. The coordinator can then send a message similar in nature to the final commit message in the regular three phase commit protocol relaying to all members that the transaction is agreed upon and all its information can be cleaned up.

Now, a compound transactional management is broken down into a set of atomic transactions and one coordinator is responsible for the whole transaction while other coordinators may handle atomic sub-transaction. In case of a failure in one or more of the atomic sub-transactions, then the compound transaction coordinator is responsible to rollback or undo other atomic sub-transactions in the compound set that may have been completed.

To reduce network messaging and due to the non-real time need to relay information about other parts of the same transaction, the 'other parts' information can also be sent as a piggyback on other transactions. More precisely, each regular transaction message contains the maximum transaction id for which all transactions prior to or including that transaction have already been totally absorbed by the channel.

Such a protocol can withstand any failure of a minority of the members of the channel, including the coordinator itself, while maintaining database Atomicity, Consistency, Isolation, and Durability, or ACID, properties. The ACID properties of a database system allow safe sharing of data. Without these ACID properties, everyday occurrences such as using computer systems to buy products would be difficult and the potential for inaccuracy would be large. Thus if more than one person tries to buy the same size and color of a sweater at the same time from a given computerized catalog—a regular occurrence, the ACID properties make it possible for the merchant to keep these sweater purchasing transactions from overlapping each other—saving the merchant from erroneous inventory and account balances. The above translates into a write access, and the above-described protocol ensures that an overall supervisor is in charge of the entire channel so that write operations can be kept under control.

The underlying effect of the protocol above is that if a majority of the members has acknowledged a given transaction then any subsequent reads will never contain the former version of the object, as it has been removed from those machines. Subsequent reads will either have the new version or time out. Upon recovery, the write transaction will either have been implemented on all members or at least one member of the original majority will still have the transaction contents and will be able to make sure it is implemented on the current members eventually. Once that happens, reads will no longer time out and they will contain the new version of the object.

Every successful write of a data record generates a unique "certificate", that is the sequential write number for the current record and as long as the protocol has operated successfully, the records last value certificate may be expected to be the same for all copies. This certificate is used for value verification as part of the read process.

Read Processing

Read processing of a query requires finding the correct record, as with the write query above, and then outputting the sought-after information. As will be recalled, the same data record is present at more than one location.

Now the data record is typically stored with a leading key, that is a first searchable field from which the record can be retrieved. It may also have other searchable fields. The database is preferably structured so that use of the leading key can be hashed to provide direct addressing to the record.

If the read query includes the leading key of the data element, then:

1. The query can be hashed and switched by the XDR to the right channel.

2. From the channel, each XDB that has a version of the record receives the query.

3. Results are returned by the XDBs to the requesting XDR, including the record content and the certificate indicating the last write operation.

4. After the XDR receives sufficient (majority) consistent results, i.e. same value and same certificate, the retrieved content is sent back as the result value to the client.

Now, as mentioned, more than one field may be searchable. Thus, in the case of a telephone directory which is primarily intended to be searched by name to find a particular number, the name field would constitute the primary key. However the directory may also be searchable in reverse if required, so that a number could be input in order to find the name. In this case the query would include a non-leading key.

If the read query includes such a non-leading key (which may be a primary or secondary index) of the data element, then the read query is first matched against an index table, to provide a primary key. In the above example the telephone number is unique, hence leading to a single result, but many such keys may not of course be unique and more than one result may be retrieved. The query processing then proceeds as above using the leading key or keys to locate the data element or elements. Secondary indexing is referred to in greater detail below. The primary key if retrieved then leads to the correct channel.

Now a search query may also include no keys at all. When the read query does not include the primary key of the data element, nor a secondary indexing to it (i.e. it is a flat "search" query), it must "select" one or more levels in the hierarchy to search within (by default it is search all, which means the root directory is being selected). An example of a query having conditions rather than keys made on the directory structure of FIG. 6 may be as follows:

1. Find Jazz tracks that are longer than 10 min ("Jazz Albums" is selected)

2. Find albums of artists that are 25 years old or younger (a join query—"Jazz Albums" and "Artists Database" are selected).

The hierarchal hash function map for transforming the hierarchy of FIG. 6 onto a hierarchy of channels is as shown in FIG. 12B. In the mapping of FIG. 12, every database and table of the structure of FIG. 6 is mapped to a super channel, note SuperChannel 1, SuperChannel 2 etc, and all the data elements within a given table are mapped to a set of subchannels. For example, the "Jazz Albums" table is mapped to Supper Channel 2.1 and all jazz record entries are hashed to a set of channels 2.1.x.

Any read query that refers to a specific jazz record is mapped directly to one of the 2.1.x channels. Then, if the record exists in the database then details will be in all μRepository copies subscribed to the same channel.

Any read query that "selects" the "Jazz Album" table is mapped to Super Channel 2.1. Each μRepository that receives the search query performs the query against its own internal repository, independently and returns any results retrieved. The query router applies the majority principle to copies of every individual pRepository result, and then merges all results to send back to the client.

A join data query is implemented as a compound transaction combined by a sequence of atomic "select" transactions. The separate queries are carried out one at a time, and the compound transaction is arranged to ensure that the result of one select affects the query made in the following selects according to whatever logic is required by the joint data query.

Recovery and Self-Healing

Reference is now made to FIG. 12C which is a simplified diagram illustrating a procedure for self-healing. The system described above is tolerant to any single failure, such that, any single failure does not compromise the system availability and functionality. The level of fault tolerance in the system can be configured by using more μRepository copies of each data record. However, once a failure occurs, the system loses some of its level of "fault tolerance" and may not survive further failures. Therefore, a "fault tolerant recovery" mechanism, called "Self-healing", that automatically restores the required fault tolerant level is now discussed.

In the following, we describe a fully symmetric and distributed self-healing mechanism for fault tolerant recovery that is triggered a configurable amount of time after a first fault.

A failure in a μRepository is automatically recognized by its peers on the same channel.

Upon detection of a μRepository fault, the following recovery process is implemented:

1. The other members of the channel to which the μRepository belongs recognize that one of the repositories on the channel is faulty. If the coordinator of the channel is not the faulty one, then the coordinator initiates a change in the set of members of the channel by adding a new server to the channel to host the missing μRepository copy. The newly rehosted copy is resynchronized with the channel by the channel coordinator. Subsequent write transactions on the channel reflect this change as described in FIG. 12D.

2. Alternatively, if the faulty server is the coordinator of the channel, then the reminding servers in the channel elect a new coordinator for the channel that coordinate the addition of a server to the channel and coordinate the addition with the channel data as described in 1 above in FIG. 12D.

As described in FIG. 12C, when a server fails, a recovery process needs to take place in all the channels that the faulty server is subscribed to. In some of these channels the faulty server was the coordinator and, therefore, as part of the recovery process a new coordinator needs to be elected to the channels. To coordinate the recovery process of all the recovered channels an over-all "self-healing" coordinator is elected to coordinate the recovery process by using a pre-compiled recovery plan, or by generating a new recovery plan if needed. Such a recovery plan can be thought of as a "recovery matrix", as described in FIG. 14, that specifies for each μRepository copy that was hosted on the failed server to which of the surviving servers it should be effectively migrated. Using this system the data is rebalanced so that the loss of the failed server has minimal effect on availability of the data on the μRepository it hosted.

Reference is now made to FIG. 13 which is a chart in which seven columns B1 . . . B7 represent seven servers. The servers between them host thirty five channels C1 . . . C35. Each server is subscribed to fifteen channels—represented by filled in boxes, and each subscription represents a μRepository being hosted. Thus, as shown, the seven servers each hosting fifteen μRepositories. Each μRepository is copied three times to give a total 105 triplicates of 35 base μRepositories that are mapped to the 35 channels. The intersection between B2 and C11 is filled—meaning that Server 2 is hosting a copy of μRepository 11, and is therefore also subscribed to channel 11.

Reference is now made to FIG. 14 which illustrates how the structure of FIG. 13 may be altered in order to compensate for the failure say of server No. 3. Server B3 fails but all the repositories on server 3, marked in dark shading, are present at two other locations. In the recovery plan, Server 7, to take an example, receives a "Server 3 down" emergency signal from the emergency channel, and then it initiates three new μRepository copying processes to copy repositories that are on channels 1, 3, and 4 to copy the microrepositories lost at B3/C1, B3/C2 and B3/C4. The content is replicated from the other two copies that are subscribed on those channels. Server 6 likewise copies content on channels 6, 8, and 10. Server 5 copies content on channels 11, 15 and 18. Server 4 copies content on channels 19, 22 and 26, and then servers 2 and 1 share between them channels 30 to 33. Copied repositories are shown in darker shading.

Channel Implementation

As mentioned above, the channels implement hierarchical hashing schematics. The channels may be thought of for simplicity as shared media between the μRepositories. In general, however, shared media, does not scale very well when adding repositories. This is because the shared media adds processing pressure on all repositories when density grows.

Most efficient networking architectures are thus realized through a switched infrastructure which opens up a graph of interconnected nodes, and a minimal multicast spanning tree which holds μRepositories as leafs.

Reference is now made to FIG. 15 which is a schematic illustration of a channel switched network graph representing a multicast spanning tree.

An application layer switched network having application forwarding nodes can be defined. The forwarding nodes are also known as Land Marks in the DHT (Distributed Hash Tables) implementation. It is efficient to use a channel hash function that maps into the address space of a standard network technology in the physical, link, or network layers. Such methodology allows a switched hash graph to be implemented via off the shelf standard networking equipment. Such a channel hash map enables the collapsing of layers of computation for the realization of the channels, and can result in wire speed processing of the distributed switched hashing within the channels. Consequently, the use of such a hash map enables efficient, high-speed, cost effective, and highly scalable realization of the hash schematics.

Standards Based Implementations of Channels

Example standards based address spaces that can preserve hash hierarchies include:
IETF IP V4 or V6
ATMF ATM VCI VPI
IEEE 802.D Ethernet dot1QinQ VLANs
ITUT E.164

Standard networking environments that also support standard multicast channel inline registration/subscription protocols include for example:
IGMP for IP
GARP for VLANs
UNI-NNI signaling for ATM It is also possible to pick non-hierarchical address spaces such as IEEE MAC addresses and structure a multi layer subnet network to realize a channel hashing scheme. An example of an efficient implementation that supports wire speed processing by standard hardware, and also is easily encapsulated within a general-purpose public network infrastructure is the IEEE dotlQ in Q VLAN, encapsulated via Martini or similar tunnels over a general purpose public MPLS backbone. The same can alternatively be encapsulated via LANE/MPOA over a general-purpose public ATM backbone to provide a multi site implementation.

Reference is now made to FIG. 16, which is a simplified diagram illustrating a network arrangement in which P switches (P) lead to provider edge (PE) equipment which in turn lead to Customer edge (CE) equipment. Customer Edge (CE) equipment implements IEEE 802 dot1Q VLANs and holds the data storage. According to the CPE port and tag, the CE hashes traffic to an uplink with a Q in Q double tags towards the Public/Private Service Provider Edge (PE) equipment. The PE hashes CE uplinks traffic by port and VLAN to tunnels over MPLS. Tunnels are hashed to the inner IP address space of MPLS, and according to route descriptors these are hashed to the tagging scheme of MPLS and forwarded to the Provider (P) core switches. The P core switches hash traffic according to tags, either directly or through further hashing into DWDM frequencies, TDM time slots or other transport mechanisms as appropriate across to all sites that share the distributed channel implementation. Using the above-described method over standard network technologies, allows the system to make use of the inherit hashing within the network technologies. Thus VLAN tags, IP addresses, Tag switching, time or wave-length multiplexing can be used to provide hashing data keys directly to the data at wire speed, and full wire capacity.

Examples of a distributed hash flow implementation are as follows:
CPE and CE storage area distributed hash flow:
Data key→Channel→VLAN Tag→Tag+Port→Super Tag.Tag+Uplink Port
PE and P public area distributed hash flow:
UP Link Port+VLAN→Tunnel ID→LSP IP Connection→Inner tag→Outer tag
Optical transport underlying hash flow:
Outer Tag+Port→Optical Wave Length (WDM) or/and Optical Time Slot (SONET)

For further details the reader is directed to the sections on specific channel implementation hereinbelow.

Reference is now made to FIG. 17, which shows how the various hash stages implement the channel distributed hash tables to an infinitely large size high-speed storage network. FIG. 17 shows a distributed Directory implementation. In the case of a distributed directory implementation the client query protocol is LDAP (Lightweight Directory Access Protocol Reference is further made to FIG. 18 which illustrates a channel hashed implementation of a network layout according to a preferred embodiment of the present invention. The implementation of FIG. 18 shows a central network ring with customer edge equipment. Around the central ring are databases XDB and query formulating or switching units XDR.

An implementation is now described which implements distributed database communication between access points and storage elements XDB using VLan technology and the GVRP registration protocol.

GVRP Based Channel Implementation

The method described here for implementing publish-subscribed network channels uses VLAN technology and the GVRP dynamic registration technology for a very efficient channel implementation.

A distributed database system is comprised of two types of elements, access elements XDR and data storage elements XDB. Communication between the elements is via channels, as described. Each channel represents some subset of the data stored in the database. The set of data storage elements comprising each channel may alter over time for various reasons. Maintaining channel connectivity between the access elements and the actual data storage elements comprising the channel is crucial. Data storage elements also communicate among themselves using the same channels in order to perform atomic commit operations. The channel chosen for the communication is also inferred from the data itself when the data storage elements communicate among themselves.

A strength of the current method is that data sent to a channel is only sent once from the sender. The data then reaches all channel members with the network duplicating the message at the minimum required in order to ensure that it reaches all destinations.

The method proposed comprises the following building blocks:

1. Each logical channel in the system is implemented physically by a VLAN using IEEE 802.1q VLAN technology.

2. Storage elements are receivers of data on the channels.
  a. The storage elements enroll as receivers to the channel by periodically sending GVRP registration messages for the appropriate VLAN.
  b. To allow the storage elements to enroll to multiple VLANs, typically they need to be connected to an Ethernet switch as trunk ports.
  c. Storage elements may also send data on the channel to other channel members. They do so by sending a broadcast message with the channel tag. This only reaches the other storage elements, as only they register for the appropriate VLAN.

3. Access points are senders of data to channels.
  a. To allow them to send data to multiple channels, they send broadcast messages tagged with an IEEE 802.1q VLAN.
  b. To allow the access points to generate tagged packets, typically they need to be connected to an Ethernet switch as trunk ports.
  c. The access points do not receive data on the channel itself; therefore, they should not enroll to the channel. They do not have to perform any GVRP signaling.

4. Ethernet switches, to which the elements connect, are required to support VLAN tags and GVRP signaling. For efficiency, incoming data on trunk ports are tagged with VLAN tags for which the port is not a receiver. This is an element of the efficiency of the solution as otherwise all data sent on the channels will have to be filtered at the access points.

5. Response messages sent from the data storage elements to the access points may be standard IP messages or standard Ethernet unicasts.

There are solutions today for transmitting VLAN tagged packets over a Virtual LAN on a WAN network. Several proposals have been drafted within the IETF organization for this purpose. There are also several implementations including from leading vendors such as Cisco. It is thus possible to use standard VLAN and GVRP technology as the basis for a method of implementing a low latency distributed hash table as the communication channel between the database access points and the data storage elements. The data communication then becomes a function of the data itself (i.e. with the communication being chosen by hashing the data element).

This method is efficient in the number of messages generated, as messages intended for multiple recipients on a channel are sent by the sender as a single message. The message is duplicated only by the minimum amount required to actually reach all the destinations.

IGMP Snooping based Channel Implementation

The method described here uses the IGMP protocol and the widespread implementation of IGMP snooping for a very efficient channel implementation, as will be described in greater detail below.

A strength of the present method is that data sent to a channel is only sent once from the sender. The data then reaches all channel members with the network duplicating the message at the minimum required in order to ensure that it reaches all destinations.

The method of the present embodiment comprises the following building blocks:

1. Each logical channel in the system is implemented using a dedicated IP multicast address.

2. IP multicast messages are typically sent within an Ethernet switch using the Ethernet broadcast message, as there may be multiple recipients on the switch. Modern Ethernet switches often use a technique known as IGMP snooping to avoid broadcasting such packets to all switch ports by looking deeper into the packet and using the IP multicast address. By also observing the IGMP protocol communication on the switch, the switch can know to which ports the IP packet is relevant. This widely used technique is referred to as IGMP snooping. The method suggested here is significantly more efficient when used with switches with this optimization.

3. Storage elements are receivers of data on the channels.
  a. The storage elements enroll as receivers to the channels by becoming recipients of data on the appropriate IP multicast addresses using the IGMP protocol.
  b. Storage elements may also send data on the channel to other channel members. They do so by sending an IP message to the multicast address associated with the channel. This only reaches the other storage elements associated with the channel, as only they register for reception of this multicast address.

4. Access points are senders of data to channels.
  c. Data is sent on a channel using an IP message with the destination address set to the multicast address associated with the channel.
  d. The access points do not receive data on the channel itself; therefore, they do not enroll to any channels. They do not have to perform any IGMP signaling.

5. The efficiency of the solution is significantly improved by using Ethernet switches that employ IGMP snooping.

6. Response messages sent from the data storage elements to the access points may be standard IP messages or standard Ethernet unicasts.

7. IGMP is efficient in its traversal over WAN links. Packets are replicated only when the routes or paths to recipients diverge.

It is thus possible to use standard IGMP technology as the basis for a method of implementing a low latency distributed hash table used as the communication channel between the database access points and the data storage elements with the communication being a function of the data itself (i.e. with the communication being chosen by hashing the data element).

This method becomes more efficient when the Ethernet switches have IGMP snooping capabilities. The number of messages generated is minimal as messages intended for multiple recipients on a channel are sent by the sender as a single message. The networking hardware will only replicate the message at the minimal points required in order to reach all recipients.

Ethernet Unicast Based Channel Implementation

The method described here uses Ethernet (unicast) communication for the communication channel.

The present method is based upon usage of Ethernet unicast messages, i.e. communication within the channel is done using unicast messages. The Ethernet unicast sender is the source of the message regardless of whether the sender itself is a member of the channel. Each message intended for the channel is replicated to all members of the channel as it is unicast to each member using the member's MAC address as the Ethernet destination address. Therefore, a mechanism for maintaining the membership list of MAC addresses of each channel is required. The present method comprises having each element communicating to a channel, regardless of whether it is a member of any channel, maintain its own membership lists of MAC addresses. These lists are updated dynamically with communication failures prompting updates to the membership lists. The channel membership resolution protocol of the proposed method bears similarities in nature to the well known ARP protocol in the sense that a temporary mapping cache is maintained between two network addresses. A major difference is that the ARP protocol maintains a one-to-one mapping between IP addresses and MAC addresses while the proposed method translates a single channel address into several MAC addresses.

Each element maintains its own cache of the channel to MAC address information. The cache is then accessed by the element when attempting to send a message to a channel. Old information is removed from the cache. When the information in the cache is insufficient, the channel resolution protocol, whose messages are described below, is utilized to obtain the required information. The information is considered insufficient if the number of targets is below some functional minimum. For the purposes of the database described above, the minimum is the majority of the channel members. Also, if an element generates messages on a channel but does not receive sufficient responses within some time frame shorter than the cache aging removal timeout for old information, the element may refresh the relevant channel information explicitly.

Messages Used in the Ethernet Unicast Based Channel Implementation

The following messages are used in the channel membership protocol of the proposed method known as the channel resolution protocol, hereinafter CRP.

1. A CRP_request message is an Ethernet broadcast message used to request members of one or more channels to send their MAC address to the requester. The requester also marks its own status with regard to each channel with the following options:

a. The requester does not regard itself as a member of the channel.

b. The requester is a regular member of the channel (one of the data storage elements).

c. The requester is the coordinator of the channel. This means that it is the element currently responsible for coordinating atomic commit procedures within the channel—see the discussion on coordinators elsewhere herein.

2. A CRP_response message is an Ethernet unicast message sent from channel members in response to a CRP_request message. The response message includes all information that the responding element has on the channel including the role of each element on the channel. The response message comprises a list of channels. For each channel, there is a list of MAC addresses of the members and the role that member has in the channel, i.e. whether it is a regular member of the channel or the current coordinator of the channel.

a. Typically, the coordinator of a channel is aware of all members of the channel.

b. Typically, regular members are only aware of themselves.

c. An alternative to a unicast message here is to broadcast the message using an Ethernet broadcast message. The advantage is that the information may be pertinent to other elements as well and will reduce the overall number of requests in the system. The disadvantage is that the broadcast may be irrelevant to the other elements and will flood the network excessively.

3. Periodically, storage elements are broadcast by sending an Ethernet broadcast message containing their entire channel membership status information. Such a broadcast message has the same internal structure as that of a CRP response.

Extensions to the Ethernet Unicast Based Channel Implementation

1. The same method may be used with minor changes, for example using other layer two technologies with non-reliable (or reliable) broadcast and unicast messaging, e.g. Infiniband.

2. The same method may be adapted to IP technology by replacing the Ethernet unicast with IP communication (as raw IP or as UDP packets). In addition, it is advisable to replace the Ethernet broadcasts with an IP multicast to which all storage elements enlist.

It is thus possible to use widely available Ethernet unicast communication as the method for implementing a low latency distributed hash table for use as a communication channel between the database access points and the data storage elements. Hashing allows the communication to be a function of the data itself, meaning that the communication is chosen by hashing the data element=.

As explained above, read operations can be carried out substantially simultaneously without compromising the data. However write operations can interfere with each other.

Majority Based Leader Election Protocol Used in the XDAP Protocol

The following describes an embodiment with majority based leader election in distributed asynchronous networks so that a leading processing unit can be selected to provide decision-making control of write-based operations.

To date, significant work has been done on protocols tolerant to various types of node and link failures in distributed systems. State of the art papers in this domain include:

Leader Election in the Presence of Link Failures, Gurdip Singh, IEEE Transactions on Parallel and Distributed Systems 7(3), March 1996.

Leader Election in Asynchronous Distributed Systems, Scott D. Stoller, Technical Paper, Computer Science Department, Indiana University, Bloomington, Ind., USA, Mar. 9, 2000.

In parallel, significant work has been done in the past on robust protocols for group decision making for the purpose of atomic commits. A good summary can be found in Consistency and High Availability of Information Dissemination in Multi-Processor Networks (dissertation for Ph.D.)—Chapter 8, Idit Keidar. Submitted to the Hebrew University in Jerusalem, 1998.

To the best of the knowledge of the present inventors, the scientific community has not observed the problem of leader election and the problem of atomic commit in distributed computing domains within the same single context. At the same time, in most atomic commit algorithms a coordinator is required. The coordinator is typically chosen by the group using a leader election algorithm. Within the context of real distributed computing environment that endure link and component failures, the separation of the two domains leads to situations in which the success of the separate solutions in concluding successfully is incoherent. In other words, absurdly, in the current art, there are situations in which the pattern of failures and the algorithms chosen are such that a leader may be elected that cannot coordinate atomic commits. Also, absurdly, in the current art, there may be situations in which the pattern of failures and the algorithms chosen are such that a leader is not elected, although there is a node that could have successfully coordinated atomic commits.

In order to overcome the above drawbacks of the prior art, the leader election taught herein is tightly bound with majority based three phase atomic commit. It is thus possible to prevent incoherent successes or failures of the conclusion of the leader election process and thus the majority based three phase atomic commit.

The present solution is a direct consequence of the desire to generate an IMS-ready database. The present solution provides a way of meeting the guaranteed latency, high throughput and continuous availability requirements for a database posed by the deployment of an IMS compliant telecom network intended for use of millions of subscribers, since it comprises a distributed database solution capable of withstanding several failures of various types. Part of the ability to withstand several failures includes the ability to perform atomic commit in severe failure situations. To perform the atomic commits, it is preferable that both the leader election and the atomic commit algorithm itself can succeed in severe failure situations. Tight coupling of the leader election and atomic commit algorithms leads to a leader election algorithm that is much more resilient to failure than other leader election algorithms as the required inter-node pattern of communication required is relatively small. That is, the required inter-node communication is the minimum required for majority based three phase commit.

The tightly-coupled algorithms make elegant shortcuts by taking into account the size of the group of nodes comprising the database. The algorithms may be generalized to an unknown sized group.

At its core, the tightly-coupled algorithm being suggested is based on an enhancement to the Garcia-Molina invitation algorithm. Hector Garcia-Molina, Elections in a distributed computing system, IEEE Transactions on Computers, C-31 (1):47-59, January 1982. The algorithm comprises combining leader election and 3PC fault tolerance protocols to one protocol that guarantees election and commit under the same fault scenarios.

The following describes the high level characteristics of the election algorithm.

High Level Stages of the Majority Based Leader Election Protocol:

According to the presently preferred embodiments, leader or coordinator elections are carried out at the following junctures:

1. System Initialization: When all nodes (or processes) initialize and join the distributed database for the first time, there is no current known coordinator. A coordinator is therefore elected and all nodes acknowledge the election to ensure that the coordinator identity is common knowledge).

2. Node Joins: When a new node joins a system, for example after a reboot, it preferably acknowledges the current coordinator. Thus the joining by a new node does not trigger an election process, and that is true even if the new node's unique identifier is higher than the current coordinator's unique identifier. As will be discussed below the identifier is used in the election process. It is a desirable feature of the algorithm to try and maintain the current coordinator as much as possible to limit any performance drain on the database system emanating from coordinator transition operations.

3. Coordinator Failure: Upon coordinator failure, for example when the coordinator machine crashes, an election is preferably performed by all nodes that remain connected. In essence, the election is identical to the one invoked upon system initialization.

4. Connectivity Failure: When a coordinator and a group of nodes that do not constitute a majority of the nodes, in other words less then (N-1)/2 nodes, are disconnected from the majority, the majority of the nodes that are still connected preferably elects a new coordinator. Once full communication resumes, the minority nodes, including the former coordinator, preferably recognize the leadership of the new coordinator and join it.

5. On Demand Election: A coordinator preferably invokes an election process without nominating itself. This could happen if the coordinator identifies a problem in functioning as a coordinator (CPU, memory, heat, etc.) and decides to handover the responsibility to an alternative node.

The Algorithm of the Majority Based Leader Election Protocol:

The coordinator election protocol requires each element to have a unique identifier, requires certain system messages, has a number of predefined election states, and requires certain timing signals and timeouts. These issues are now addressed.1. Unique Identifier (UID): Each node (or process) is assigned a unique identifier (UID). There are various well known techniques for generating UIDs. The simplest uses a MAC address on the system as the UID.

2. Messages: All messages share the same known members list. The following is the list of messages used in an exemplary election scenario. The frequencies referred to relate to an embodiment in which frequency division multiplexing is used for the signaling.

2.1 I_AM_ELECTED_COORD: This is a broadcast message sent periodically using a frequency of F1, by the coordinator. It is intended for all system nodes and is used to assure them that they still have communication with the coordinator.

2.2 I_AM_COORD_CANDIDATE: This is a broadcast message sent during an election. A node that considers itself as a coordinator candidate broadcasts this message with frequency F2.

2.3 I_ELECT_YOU: This is a unicast message sent from a node to a potential coordinator. This message is sent both as a response to an I_AM_COORD_CANDIDATE message and as a response to an I_AM_ELECTED_COORD message.

2.4 IS_THERE_COORD: This is a broadcast message sent with a timeout of T3 by each node as it begins participating in an election.

3. XDB Election States:

The following is a list of exemplary states that elements or nodes can enter during the course of or in between elections.

3.1. IS_THERE_COORD: The "is there coord" state is the initial state of a node as it begins participating in an election. T3, as referred to above, is the silent period after sending out an IS_THERE_COORD message during which it listens to see if there are election messages.

3.2. CANDIDATE: When a node enters the candidate state, it nominates itself to be the coordinator by sending the I_AM_COORD_CANDIDATE message. The node remains in the candidate state for a maximum of T6 time. If another node has become the coordinator in the meantime, the node will try and join that coordinator. If a node with a higher UID is heard from and which the present node has not failed voting for recently, the node will proceed to vote for that node. If the T6 timeout is reached, the node will proceed to vote for another node, even if it has a lower UID.

3.3. VOTED: A node enters the "voted" state when it wants to vote for another node to be the coordinator. The node may only vote for one candidate while in the voted state. Normally, the node will vote for the node with the highest UID, but there is also consideration for the fact that if voting for a node does not lead to a successful conclusion with the candidate becoming the coordinator, then the node will alter its vote next time it enters this stage and choose the highest UID among the nodes it has not voted for recently.

A node in this state stops sending messages with its own candidacy if it has traversed from the CANDIDATE state.

The node moves to the IS_THERE_COORD state after a timeout of T4 during which it does not hear from the voted candidate. This mechanism allows changing the vote eventually.

The node moves to the IS_THERE_COORD state after a timeout of T5 during which the candidate failed to became a coordinator no other coordinator was elected. This mechanism allows changing the vote eventually.

3.4. ELECTED: A candidate will move from the CANDIDATE state to this state upon receiving a majority of votes to its candidacy broadcast (the responses are considered as I_ELECT_YOU messages). Once entering this state, the node assumes the coordinator's responsibilities including sending the I_AM_ELECTED_COORD broadcast.

3.5. ACCEPT: This is the state in which a node accepts that a node broadcasting the I_AM_ELECTED_COORD message is the coordinator, even if the node had voted for some other node or had seen itself as the candidate.

4. Timers: The following list of times, timers and frequencies is used by the election process:

4.1. F1—The frequency at which the I_AM_ELECTED_COORD message is sent. Time T1=1/F1.

4.2. F2—The frequency at which the I_AM_COORD_CANDIDATE message is sent by a node in the CANDIDATE state. Time T2=1/F2

Empirically, it was determined that good practice is:

4.3 F2=2.5×F1

4.4. T3—The interval for observing network traffic during the IS_THERE_COORD state 4.5. T3=5×T1, where T1=1/F1

4.6. T4—The interval from the last time a node votes for its candidate (as a response to a candidate message) and during which it did not any broadcasts from the candidate it has voted for. It is assumed that that node has voted for someone else in the interim and that this node should be allowed to change its vote at this point by restarting the election.

$T4=10\times T1$ 4.7. T5—The interval during which a node consistently votes for a certain node but during which the node voted for does not succeed in achieving a majority. Subsequently, the node restarts the election.

$T5=200\times T1$ 4.8. T6—This is the interval that limits the time a node continues to be a candidate if it cannot gather a majority, and nevertheless it does not hear from another elected coordinator or from a candidate with a higher UID. The node gives up its candidacy and looks for another node to vote for.

$T6=500\times T1$ 4.9. T7—This is the general election timeout. If the coordination election has not ended within this time frame, the entire election process is restarted.

$T7=1000\times T1$ 4.10 T8—T8 is a timeout. After the T8 timeout, a vote is considered as expired.

$T8=30\times T1$ 4.11 T9—T9 is a timeout. After the T9 timeout, a candidate node is no longer considered to be a candidate.

$T9=7\times T1$

A notable element of the present algorithm is the way in which it is tailored to match the purpose for which the leader is elected, which is to be the coordinator of a distributed database that requires bi-directional communication to all other database nodes in order to perform three phase atomic commits. Other nodes do not necessarily have to communicate among themselves.

This perspective leads to a different algorithm than those usually discussed with the advantage that leader election will conclude if and only if the required pattern of communication exists.

Accessing Data-Records by Using Secondary Indexes as the Basis to Map Records to Network Addresses In the above data management system an implementation is provided for databases, directories, registries, storage systems or repositories, which is based on the implementation of data-records indexing using mapping/hashing functions to map the data-records' leading keys to network addresses and the defined XDAP Data Access Protocol for doing so.

However, it is not always sufficient to access data based only on leading keys. Often there are secondary, tertiary and further level keys which need to be searched at least on occasion.

It is thus intended to add the ability to search beyond the primary key to the other benefits of the present embodiments, namely the ability to leverage standard high-speed network equipment to store and fetch data-records for read and write operations at high speed, high throughput, and high scalability. Using the techniques described, functionality is extended to enable accessing of data using secondary indexes in the same way as the previously described primary index based access.

The present embodiment teaches the technology and implementation of accessing data-records in the system using secondary indexes as the basis to map records to network addresses. Consequently the secondary addresses can be used to store and fetch the records on remote computers in non-blocking wire speed using standard network elements, as with the primary addresses.

Thus we take as an example a record that might be kept by a government agency of its citizens. The record may include fields as follows: the name, social security number, home address, telephone number and passport number. It is desired that all fields are fully searchable but only one key can be the leading key and directly hashed on to the primary network's addressing system.

The fields may be organized into primary and secondary fields using the following scheme: Record person; primary key: social security number (used as a leading key to map record to network address 7:9:B:8:4:A). Secondary key 1 is home address; secondary key 2 is telephone number; and secondary key 3 is passport number.

The primary key is preferably chosen for efficiency. Thus the most likely field to be searched or the most likely field that always gives a unique answer would be chosen as the primary field for the primary key. Secondary keys, which may or may not be unique, can also be used by the client application of the data-management system to access data-records.

Secondary keys can be defined for ranges of values and any compound set of values involving more then one field. For example we could say that the combination value of age: under-age and home address can be used to access data-records of children leaving in a specific house.

Traditional, that is prior art, secondary and primary data-record indexing is implemented using computer based data-structures and search procedures, mostly search-trees such as ⅔ trees, red/black trees, or AVL trees. Using these methods to implement secondary key based access, essentially cross-indexing back to the primary index, hampers the benefits of the above-described system as implemented using leading key access.

In the above-described data management system, standard networking is used to store and fetch data-records. It was described how this method avoids bottlenecks and blocking lines in memory access when searching for records. Secondary key searches that are implemented using the traditional or prior art technologies compromises all these benefits while data is searched through secondary keys until leading keys are retrieved. Only once the primary keys have been retrieved do the subsequent operations become non-blocking and efficient. This means that for all queries that access data using secondary keys, blockage of sequential lines are likely to occur around accessing memory or disk based data structures.

Up until now data-management systems have mostly been single computer based, or alternatively have been partitioned to multiple data-systems accessible over a computer network and managed as hierarchical systems—and the reader is referred to the background hereinabove. Indexing in these implementations has generally been based on in-memory and in-disk data structures that support search procedures and use structures such as search trees.

Such structures are generally sufficient in these more limited circumstances since servers hosting data-management systems grow in speed and capacity in proportion to those of the computers hosting client applications. Thus, if a server supports N clients (and is N times faster then client computers) and these clients processing capacity grows K times through technology advantages (Moor's law) then so would that of the server (N*K) and so data indexing implementation using server memory and CPU would continue to fill requirements.

Today however, there is a growing pattern of computer peer to peer applications for communications and not just client server applications. When such applications require data access as a side effect to the peer-to-peer communication then the linearity that previously occurred is no longer applicable. If N computers are engaged in peer to peer applications then a pressure factor of N Square may result in accessing related data-management systems (N*(N−1)/2 conversations) and proportional linearity is broken.

In classical peer to peer applications such as consumer telephony, standard general purpose data-management systems such as commercial databases have never been used until now for on-line data management operations for this exact reason. Such operations as resolving location of a telephone in the network were an integral part of the dedicated special purpose telephony network and application specific network signaling rather than of a general purpose data-management system.

It is only now, as general purpose networks are starting to be used for massive peer to peer applications that a general purpose data-management system is required to match the full polynomial pressures of network (Metcalf's law) activity when it is used to resolve and store on-line call data.

As a solution to the above, the following embodiment teaches how to implement data-record access using a network to overcome bottlenecks. The network link layer is the basis and backbone for the system and not computer memory or disk, and thus it is possible to implement indexing using network layer overlays and adding network layer addresses to each record. Hence, just as we may overlay multiple network layer subnets over the same link layer network, we can overlay multiple indexing schemas to the data and continue to implement the data management system using efficient concurrent standard network equipment.

Thus, as explained, primary data-record access is implemented by associating and mapping each record to an Ethernet link-layer network and MAC addresses. In addition, secondary indexes are then implemented as multiple IP subnets overlaid on the same Ethernet link-layer network, and standard routers, as well as distributed routers and routing methods can be used to map network addresses of secondary indexes to the MAC of the primary index. Thus the secondary mapping to the primary keys is carried out by a standard network component, the router, carrying out exactly the function it was designed for. Data copies and non unique indexes can still exist by using group addressing both for the link and network layer addresses i.e. MAC and IP addresses in the example.

The technology for data-access using secondary keys according to the present embodiment is illustrated in FIG. 19 and contains the following elements, as referred to above:

XDR—the object that receives the data-access query, XDR1 . . . XDRn

XDB—the object that stores the data-record, XDB1 . . . 12 at sites A, B, C and D, and the XDAP protocol,—the protocol used to store and fetch records given multiple copies, packet replications, packet-loss and element or segment loss.

In addition Switches 1901 are the link layer objects that are interconnected in a network structure and connect all XDBs and XDRs, and Routers 1903—network layer objects that, given a network address, forward packets from one link layer address, to a destination with another link layer address.

FIG. 19 illustrates the use of routers to support multi-indexing on the network using distributed index routers. As explained above the system also incorporates load balancing and redundancy.

Reference is now made to FIG. 20 which illustrates a one-arm router for allowing searches by secondary key of a database arranged according to a primary key. A query based on a secondary key is issued by XDR 2002 and is directed to router 2004. The router receives the query and looks up the secondary key in its routing table to find the corresponding primary key. The primary key is hashed in the normal way and the hash result is used to direct the query to XDB 2006. The query is then forwarded back to the same network with the correct XDB as the target link layer address.

An example of using the data access system according to the present embodiment and specially using secondary keys is mobile telephony, where SIM card IDs and telephone numbers are both keys although only one of them is a primary key. All queries on the secondary keys (say telephone number) are mapped to a network address in the subnet allocated for these keys. Enough one-arm routers are plugged into the data-access network so that when a query involving a telephone number is received, the XDR maps the number to a network address, and then forwards it to the subnet's router. The router forwards the query to the correct XDB in which the MAC address corresponds to the primary key. The primary key was transparently learned by the router when the XDB had the last secondary key update and assumed the relevant network layer address and performed a standard registration procedure with the subnet router. This in fact works in the same way as when an IP address is configured in a computer.

Accessing and indexing large volumes of data over the network and as result of network applications is key. This technology can be used to form large distributed storage, databases based on carrier infrastructure or fully distributed between interconnected end-stations.

An example of use of the above is for services where data lookup is required within very strict time or other performance limits, that is to say with highly defined Quality of Service requirements.

Accessing Data-Records by using Secondary Indexes that are Stored and Hashed as Other Tables Another way of implementing secondary indexes that does not use routers, but still provides non-blocking real-time access to data records via secondary indexes is described here. In shared nothing distributed data repositories, tables are partitioned using a partitioning key and distributed between different computing resources. In such shared nothing architectures, secondary indexes, typically, are also distributed among the different partitions such that each partition holds the secondary indexes of the sub-table that belong to the partition. This tight co-location of table partitioning with its corresponding sub-index has benefits, when supporting database operations that are all well scoped within a given partition.

For example, a database holding CDRs (Call Data Records) can be partitioned by date, i.e. all calls made on a certain date belong to one partition. An example of a secondary index for the CDR database can be calling phone number. In such a partitioning example, co-locating the Sub index by calling phone number of all the calls made in a specific date in the same partition of all the calls made on that date makes the computation of some common queries efficient (e.g. all calls made by a given subscriber in a given day).

However, in many other cases co-locating partitioning sub-indexes with the partitioning data itself creates a blocking data structure that makes data-access via secondary indexes un-scalable.

For example, the data base mentioned above with ID number may be the leading key and the partitioning key. If the phone number secondary index is sub-indexed for each ID-number partition rage, then accessing the data record by using the phone number will require broadcasting the query to all subscribers.

Another way of implementing secondary indexes without routers, but still providing non-blocking real-time access to data record via secondary indexes is part of the in-network distributed data management described here. The phone number secondary index is implemented as another table, "index table" that has two fields: "phone number", and "ID Number." The Index table is then partitioned such that the secondary index field "phone number" is the leading key of the index table. The secondary table is automatically updated by the system every time the original table is modified. The secondary table is managed (in terms of read and write operations) as any other table in the system. Therefore, accessing an entry in the index table is done at wire speed, like accessing any data element using its leading key. Hence, accessing data elements in the original table using a secondary key is implemented by:

Accessing the index table using the index table leading key and receiving the leading key of the original table.

Using the resulting leading key to access the original table data element.

This method of hashing index table cross partitions allows a user to locate any data element using its secondary key in a non blocking way by using two leading key base data element access, first accessing the index table, then accessing the original table.

Uptime Model of the System

The following demonstrates achieving of Five and More Nines (>99.999%) in terms of system availability using Only 3-5 Replicas Based on the in-memory distributed data system described above it is possible to calculate the expected availability of the system as a function of the number of computing elements and the way the virtual data partitioning is mapped to the computing elements.

As explained above, thorough shuffling of the virtual data partitioning copies between the computing nodes increase the overall load-balancing and interdependencies between computing nodes. On the other hand, by arranging the computing nodes in sets (called herein resiliency sets) that are assigned to a group of channels, as can be seen in FIG. 24, the availability of the system can be increased. Since every resiliency set can now lose a minority of its copies and the system will still be available, the resilience of the system overall is very high.

The following uptime model is used for each computing element "slot" in the system:

| | |
|---|---|
| Average number of annual server faults: | 2 |
| Maximum self-healing duration: | 0.5 hours |
| Annual vulnerability time for each server "slot" | 1 hours |
| Average server "slot" availability (working or self-healed) | 99.989% |
| Number of server "slot" avilability "9s": | 3.94 |

System Availability Model

Using the above system availability model it is possible to calculate the graph shown in FIG. 20B. The above graph assumes that the performance of each XDB is 15,000 operations per second (as was demonstrated in Lab tests).

As can be seen from the graph, three copies are sufficient to provide over 5 nines of availability (>99.999%) for a system that has up to 200 XDBs and generates about one million transaction per second. Such a system is sufficient for most IMS carrier class application supporting up to 80,000,000-100,000,000 subscribers.

As can also seen in the graph above, 5 copies provides more than 8 nines (>99.999999%) availability for systems of that capacity, and can provide more than 6 nines of availability for systems that provide 4-5 times of Number of resiliency sets: s
Number of XDBs in each resiliency sets: l
Data replicates: r=2m+1
Server availability: 1−p $$\text{System availability} > 1 - s \binom{l}{m+1} p^{m+1}$$

the capacity which is beyond practical needs for IMS systems.

Managing Quality of Service (QoS) Between Concurrent Database Clients

An embodiment for managing quality of service (QoS) between concurrent database clients in terms of transaction latency and throughput is now described.

Database's service level metrics today typically refer to:
(1) the latency of an atomic database operation such as read a record or write a record, and
(2) the number of concurrent sessions.
(3) the transaction rate In addition, implementing latency assurance in databases is usually done by setting priorities to certain tasks. Guaranteeing the latency metrics under the following circumstances are questionable:
1. When system load is high (system load affects latency metrics).
2. Distributed databases (system distribution makes it hard to limit operation duration).

Real-time databases are a fundamental component of real-time applications that are widely used in numerous areas such as e-trading, telecommunications and manufacturing. Real-time applications are evaluated by the service level they provide. The service level comes to measure the end-user experience. The end-user experience includes the following:
1. Service availability:
2. Can the user get service whenever he wishes to.
3. Service responsiveness:
Does the service respond quickly enough.
4. Service overall quality:
Is the service itself good enough—user's overall experience.

Naturally, a real-time application service level is a concatenation of the service level achieved by any single component within the application platform.

Real-time applications are evolving and apparently they:
1. Are becoming more distributed in nature.
2. Have unpredictable workloads.
3. Have unexpected access patterns.
4. Become service oriented rather than client-server.

Currently, it is believed that no database and specifically no distributed real-time database implements Quality of Service mechanisms to guarantee the database.
(a) availability per access point (throughput: number of operation per second),
(b) responsiveness (bounded latency per atomic operation) and
(c) Data freshness and consistency (data is up-to-date and accurate).

The above metrics must be guarantees, while allowing the following mutual conditions to exist:
1. The database is distributed over any number of sites.
2. The database enables any number of concurrent access points.
3. The database can perform any combination of operations indifferently.
4. The database performs indifferently under any workload.

The present embodiments comprise an in-network real-time database. The embodiments use the network to transform the database into a single global cross-location networked service. As such it inherits from the network itself several characteristics and among others typical network QoS metrics are delay, bandwidth and improved loss characteristics. The new concept of database QoS satisfies real-time application service level agreement requirements.

The presently described embodiments are the first database to suggest and implement a QoS concept that can be used to map real-time applications service level metrics into real-time database performance metrics.

Such metrics may include:
1. Guaranteed database throughput per access node:
  a. independent of database workload
  b. independent of the number of concurrent access nodes (each node can serve a different application)
2. Guaranteed database latency per atomic operation:
  a. Independent of operations mix
  b. Independent of database workload
  c. Independent of data physical location
  d. Independent of data schema
3. Application Quality⇔Database Data Consistency:
  a. Independent of the data physical location
  b. Independent of the number of data replicas across the system.

As discussed elsewhere herein there are provided best-effort practices in case of a failure within the database.

As explained above with respect to FIG. 4, a distributed database system is a cluster of servers that comprise three basic types of nodes: access node, data node and switching node. Access node primarily handles client requests and returns response accordingly. The data node primarily stores data records within its memory and is manages the data, for example: retrieve a data record or store a data record on a non-volatile storage. Switching node primarily connects all cluster nodes and routes messages among the various nodes. Both access and data nodes can reside at any physical location, independent of the rest of the nodes within the system.

The concept of a real-time database guaranteed QoS that can be naturally mapped into real-time applications with service level metrics can include various QoS metrics each of which can be implemented in various ways. The following discloses possible database QoS metrics and possible implementation practices, however other ways may be used to implement these and many more QoS metrics.

Guaranteed Throughput

The objective is to guarantee to a database client (real-time application) the number of atomic operations per second that can be performed. Atomic operations include: create a record, read a record, modify a record, delete a record. Throughput level is according to application requirements.

The present embodiments currently are able to guarantee the throughput QoS metric through:

Throughput Scalability: The distributed database of the present embodiment can unlimitedly scale its throughput by simply adding more nodes to it cluster (access nodes, data nodes, switching nodes). Each access node guarantees a certain throughput (X operations per second) and the system overall throughput is the sum of throughput of all access nodes. Thus an application can demand any required throughput.

Throughput Allocation Mechanism: The present embodiments implement a throughput control mechanism that enables the system administrator to allocate throughput quota per access node. A certain application can use as many access nodes as required to satisfy its throughput requirements. However application throughput is limited by the throughput quota assigned to the access nodes it uses to access the database, allowing other applications that use the same database resource to guarantee their required throughput.

Guaranteed Low Latency per Atomic Operation

The objective is to bound the time required to perform an atomic operation, and to keep it as low as possible. Atomic operations include: create a record, read a record, modify a record, delete a record. The latency upper limit value should not be affected by system momentary load or by the physical location of the data in relation to the access node physical location.

An operation roundtrip in a system according to the present embodiment is as follows:

Access node (parse)→Switching (forward request)→data node (process)→Switching (forward response)→Access node (respond)

The goal is to minimize the latency of each of the sub-phases of a typical roundtrip. The system of the present embodiments currently guarantees the low latency QoS metric through:

Majority Based Data Access and Data Affinity: We wish to ensure that neither node failure nor momentary network disconnections affect the availability of the data or the performance of the system. Thus, we keep several replicas of a data record, each of which is stored on a different data node. When writing or reading a data record (refer to Majority Based Leader):

All the data nodes that currently/are requested to store this data record select a coordinator. The coordinator is responsible for managing and monitoring the operation at request.

Only as much as the majority of data replicas are required to read/write the record. This assures that malfunctioning nodes do not slow the operation.

The system administrator can define data affinity policies. Meaning, the location of the majority of the data can be set to be as close to its access point as possible, neutralizing network (switching) latencies.

Concurrency and Load Balancing: Each data node is responsible for managing a portion of the data that is distributed evenly among the different data nodes. Each data node is independent of the other nodes, i.e. it can process data simultaneously with other data nodes. This enables to achieve a short latency per operation even when the system works under a high load. The database of the present embodiments may add as many data nodes to its cluster as required. The more data nodes a system has, the more concurrent data processing capacity there is, and consequently the shorter the latency per operation. By adding more data nodes, low latency levels can be kept.

Data Packetizing and Networking Technologies: The presently preferred embodiments provide network and switching nodes in order to connect access nodes with data nodes. The system involves breaking database tables into atomic records and packetizing them. Each record is transmitted over the network and stored at a different location (data node) over the network. This means that any data record reaches its data node and back at wire-speed as the underlying network QoS level, regardless the number of operations that are currently being performed or the data schema.

Guaranteed Real-Time Data Freshness and Consistency

The objective is to assure that any change to data record takes effect immediately. The application can always retrieve the latest most updated data and be sure that this data is consistent across the system.

The present embodiments currently use several mechanisms and algorithms to assure data freshness:

Three-Phase Commit: This is discussed elsewhere herein

Majority Based Data Access and Error Corrections: This is discussed hereinabove.

Best Effort Practices In Case Of Data Node Failure

The database preferably guarantees its QoS level. However in case of a data node failure, the system does its best to satisfy the required QoS with its remaining resources.

The presently preferred embodiments use several mechanisms and algorithms to assure data freshness:

Unlimited number of access nodes: The present embodiments enable any number of access nodes. The access nodes allow each application to connect to more than a single access node. In case one of the access nodes fails, the application can work with another node, assuring that its access rate (throughput) does not degrade.

Automatic Self Healing: The present embodiments implement a self healing mechanism of their data nodes. Since each data record has several copies at different nodes, upon the failure of a data node the data is still available in the remaining data nodes. Thus, the remaining data nodes take responsibility over that data. The data affinity is optimal across system resources, and thus the workload is distributed evenly among all the data nodes within the cluster. Assuming that the remaining data nodes have the capacity to store the additional amount of data assigned, and that they are not fully utilized, the concurrency of database transactions is maintained. This concurrency ensures that the latency of each operation and the number of operations that can be handled simultaneously comply with the QoS requirements. In that case where there are not enough resources to handle the additional data, the system still utilizes its resources optimally, doing its best efforts to meet the QoS requirements.

Real-time databases are a fundamental component of real-time applications. Real-time applications are measured by their service level. The application service level is a concatenation of the service level of every single node within the application platform such as the real-time database. Database QoS enables mapping of application service level metrics into database performance metrics and to guarantee a real-time applications service level independent of the momentary system load or access method.

Using the In-Network Database for N+M High-Availability
and Disaster Recovery of Stateful Applications The following describes using the In-Network database for N+M high-Availability and disaster recovery of stateful applications Real-Time Stateful Event Processing Applications Real-time event processing applications that are session-based need to maintain the state of the current session. Each new event that belongs to a given session is processed within the context of the "history" (i.e. the "state") of its session. Generally packet based applications simply process individual packets and pass them on, but this is not always sufficient. In many cases it may be required to process the packet differently according to a state of the session. Such applications are referred to as stateful applications.

Examples for real-time stateful event processing applications are: Telecom call-control and soft-switches, Mobile telephony Home Location Registrar (HLR), Internet Multimedia System's (IMS) Home Subscriber Server (HSS), Service Selection Gateways (SSG), AAA servers, Online billing server, Boarder Controllers, Firewalls, Online Banking and Trading Systems, High Availability and Disaster Recovery High Availability (HA) and Disaster Recovery of real-time stateful event processing application requires replicating and synchronizing the internal state of the application in real-time between different servers to ensures a stateful fail-over. In the case of disaster recovery planning (DRP), the application internal state real-time replication and synchronization is carried out between different servers in different locations.

The only DRP and HA model that works today for -time stateful event processing applications is the 1+1 model. In the 1+1 availability model applications servers comes in pairs, each server with its stand-by fail-over server. The internal states of the two servers are maintained synchronized ether implicitly or explicitly.

Implicit Internal State Synchronization High Availability 1+1 Model

Implicit internal state synchronization is done by feeding all inputs of the system to the two servers simultaneously and allowing each to process the same events at the same time symmetrically. As a result, both application servers maintain symmetric internal states. However, the capacity of both servers is reduced to the capacity of a single server.

Implicit internal state synchronization model can be used to synchronize states between more than two application servers to achieve fault tolerance for more than one fault. However, the capacity of all implicitly synchronized servers will still be equivalent to the capacity of a single server.

Referring now to FIG. 21, there is shown an implicit state synchronization 1+1 HA Model in which two units, a primary unit 2101 and a secondary unit 2102 both store the state of the process. An implicit synchronization works between the two units to ensure that the two units are updated not just simultaneously but also in real time.

Explicit Internal State Synchronization High Availability 1+1 Model

With reference now to FIG. 22, explicit internal state synchronization is used to overcome the inefficient resource utilization of the implicit internal state synchronization. Explicit state synchronization uses a dedicated connection and protocol between the two servers to exchange internal states in real-time between the servers. Each server can independently process different sessions and events. However, each server has the internal states of both servers. When one of the servers fails, then the second servers can continue to process all the sessions and events, since it already has their updated state stored internally.

FIG. 22 illustrates an explicit state synchronization 1+1 HA model in which server 1 is connected to server 2 via a link 2202 that makes use of an explicit state synchronization protocol to ensure that each server has both states.

When using explicit internal state synchronization in the 1+1 HA model, both servers can be fully utilized. However, when one of the servers is down, then the capacity of the system is dropped to a single server capacity i.e. by 50%. This can cause a serious degradation of the quality of the service provided by the system. Therefore, even in the case of explicit internal state synchronization, each server is not likely to be utilized to its full capacity such that service degradation in the case of failure will not be that severe. This reduces resource utilization.

Explicit internal state synchronization is typically limited to the 1+1 model, since typically; a real-time stateful event processing application will not be able to handle more real-time state synchronization events, than real-time production events. Therefore, internal state synchronization is not capable of providing fault tolerance beyond a single fault.

Using in-network highly available database to achieve N+M model, as in the present embodiments, it is possible to provide an in-network distributed, omni-present, highly available and non-blocking database to explicitly synchronize, in real-time, internal states of many real-time stateful event processing applications such that an N+M HA model is achieved. An N+M HA model means ensuring the availability of the system to provide minimal capacity of N servers under up to M server failures. This is achieved by running the system on N+M servers using an N+M HA model.

In the N+M HA model all N+M servers can be fully utilized while each server failure reduces only 1/N+M of the system capacity. Or, the N+M servers can be utilized up to the level of N fully utilized servers, such that any individual server failure does not reduces system capacity, up to a limit of M server failures. In both cases the resource utilization is N/N+M which typically is much higher than the maximum 50% utilization achievable by the 1+1 HA model. Since M is typically 1 or 2 even for N big as 10, the resource utilization archived by the N+M model is typically between 85%-95%.

Database centric real-time state synchronization models for N+M HA and DRP, as we are proposing, is not an option using current database technologies, that has a blocking in-disk or in-memory architecture that cannot scale to support many concurrent writes from N different clients in different locations at the same time.

Database centric real-time state synchronization model for N+M high availability The present embodiments provide an omni-present and highly available database centric real-time state synchronization model for N+M HA and DRP that provides:

1. Higher resource utilization: around 90% versus a maximum limit of 50% achievable today.

2. Higher level of fault tolerance: much beyond the single fault tolerance achievable today.

The presently preferred embodiments extend the explicit state synchronization mechanism used today from a peer-to-peer one-to-one protocol to a client server one-to-many model using a global in-network, omni-present and non-blocking database to store all states of all the real-time stateful processing application instances from all locations. In the case of one or more application instance failures, a stateful recovery of all session processing is perform by surviving application instances in the same location and/or other locations, by real-time synchronization of all required states from the state database.

The present embodiment is based on the same multi-application instance environment used today in the explicit state synchronization 1+1 high availability model. In fact the embodiment requires no change to be made to the application instance, nor to the application environment to carry out an enhancement from a 1+1 high availability model to an N+M high availability model.

In the prior art multi-application instance environment used today in the explicit state synchronization 1+1 high availability model, each real-time stateful event processing application instance synchronizes its internal state in real-time, with its peer partner. In case of failure of one of the peers, the application environment reroutes the events and messages from the failed server to its surviving synchronized peer partner.

The present embodiments provide that each application instance synchronizes its states in real-time with the state-database, exactly as in the peer-to-peer architecture, even using the same protocol. However, unlike in the peer-to-peer scenario, as long there is no failure, states are only written to the state database, and no states are synchronized back to the application instances.

Reference is now made to FIG. 23 which shows an N+M high availability model using a state database.

In the case of the one or more application instance failures, such as in the peer-to-peer case, events and messages are rerouted from the failed servers to some or all of the surviving application instances. There are two possible modes that the system can operate:

1) Push Synchronization Mode: Exactly as in the peer-to-peer case, the application environment re-route all events and messages that belongs to a given failed server to one of the surviving servers in the same location or in another location. In this case the state database proactively synchronizes the appropriate states by "pushing" them to the surviving server, again, using exactly the same protocol used by the peer-to-peer synchronization.

2) Pull Synchronization Mode: In this case the application environment re-routes events and messages away from the failed server to all surviving servers in the same location and/or in different servers. Therefore, each of the surviving servers that receives an event or message that it does not recognize, since it does not have its state, pro-actively "pulls" the state from the State Data base.

Both push and pull modes can co-exists in the same implementation. In such a case the push mode can be also viewed as a kind of "pre-fetch" of states that otherwise would be requested one by one upon demand.

As described, the present embodiments provide an in-network distributed, omni-present, highly available and non-blocking database to explicitly synchronize in real-time internal states of many real-time stateful event processing applications such that an N+M HA model is achieved, increasing the resources utilization by a factor of 2 while providing unlimited fault tolerance level.

The above can be achieved for systems that implement explicit state synchronization mechanisms for 1+1 HA, with any modification either to the application instances or to the operation environment.

In-Memory Database System Pricing Models

In the following is discussed a pricing model that is suitable for the above-described embodiments and other similar applications. A value based pricing model for a DBMS (Database Management System), is derived using certain of the key customer values such as transaction rate, capacity and throughput.

Existing DBMS software licensing pricing as used by current providers such as Oracle, IBM DB2 and others use parameters for their pricing systems that are not issues of key customer interest and are thus regarded as unfair or arbitrary at best and specifically in the interest of the service provider, as opposed to the customer, at worst.

The following is a survey of current pricing systems.

1. User/Subscriber/DB-Client Model—The price charged is related to the number of users/subscribers/DB-clients that connect or are permitted to connect to the database server. From a customer's point of view, user based pricing, creates inefficiency in those cases where some of the users/subscribers/DB-clients are heavy users, while others use it rarely. User based pricing is the same for all users irrespective of the actual level of use.

2. Number of processors model—In this model the amount charged is based on the number of processors being utilized by the system—CPUs are counted within the same multi-CPU server (SMP) or across different servers that are running in a cluster configuration (e.g. Oracle RAC). Sometime, multi-core CPUs are counted per each core. The per CPU/Core price is the same regardless of the clock speed of the CPU and the marginal performance contribution of later added CPUs. Regarding this marginal performance contribution it is noted that, in a multi CPUs configuration, ether in a SMP and/or Cluster configuration, there is a diminishing marginal utility from each of the processors as they are added to the system. The tenth processor added makes far less of a contribution than the first processor. This means that while the payment is equal for each and every processor, the additional marginal utility per additional processor is lower and lower, thus creating inefficiency from the customer's point of view. Moreover, customers feel that they have to pay a premium for the inefficient utilization of CPUs by the DBMS software and that DBMS vendors has a negative motivation to improve the CPU effectiveness of their software products. It is more cost-effective for the provider simply to add CPUs until the required capacity is achieved than to reconfigure the system to provide the capacity in the most efficient way.

The DBMS software license pricing model of the present embodiments is aimed to create a value based pricing model where the client pays for the service he receives, that is he sees that the parameters he is paying for are directly related to benefit obtained. The present embodiment thus bases pricing on the actual performance of the DBMS system from the customer point of view. Thus parameters such as peak transaction throughput are used rather than technical parameters, such as per subscriber or per CPU.

he DBMS License pricing model of the present embodiments is based on the actual peak throughput of the system:

The Software License Price=# of throughput per second* X price per throughput **.

* Throughput can be measured by:

1. Database transactions count per second.

2. The total database transaction bit rate of the communication between the database clients and the database server, including all queries and returning results. Total transaction bit rate is measured in Megabits per second.

** Price per throughput can be linked to:

1. The capacity of the database in terms of GB.

2. The total number of subscribers/users.

3. Or, it can also be a fixed amount.

A preferred aspect of the pricing is that the client pays directly per throughput unit—a key performance value derived by the usage of the software.

EXAMPLE

TABLE 1

Exemplary Parameters and Corresponding Charges

Price per throughput:

| | |
|---|---|
| GB = <3 | $3,000 |
| GB = <6 | $4,000 |
| GB > 6 | $5,000 |

TABLE 1-continued

Exemplary Parameters and Corresponding Charges

| Throughput per second | # GB memory | Price per Throughput | Total Cost |
|---|---|---|---|
| 1,000 | 3 | $ 3,000 | $ 3,000,000 |
| 1,000 | 4 | $ 4,000 | $ 4,000,000 |
| 2,000 | 4 | $ 4,000 | $ 8,000,000 |

There is a growing need for very high throughput per second, as opposed to lower requirements in the past. This growing need is expected to increase dramatically as the deployment of IP telephony services grow. While in the past customers were willing to pay for inefficiency, the present embodiments obviate the need. The payment is linked directly to the transaction throughput. The clients pay for the total peak throughput of the system, which is a key value, and the payment is not linked to other technical parameters such as number of CPUs or number of subscribers.

It is expected that during the life of this patent many relevant devices and systems will be developed and the scope of the terms herein, particularly of the terms networking, database management, QoS, and throughput, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A data access system comprising a plurality of computers and a switching network, the plurality of computers respectively comprising multiple locations of physical data storage, the data access system comprising:
   database units arranged to form virtual partitions, each virtual partition formed from a database unit being independently accessible, said virtual partitions being accessible as addressable channels in an addressing space independent of said physical data storage;
   decoupling said physical data storage and said virtual partitions by using switched channel networking and creating an intermediate networking structure, wherein said data partitioning is statically mapped to the network channel, and wherein said decoupling data partitions permits reassignment of any given virtual partition between respectively independent locations of said physical data storage while maintaining said accessibility via respective ones of said addressable channels in said independent addressing space;
   a plurality of data processing units, and
   said switching network receiving data access requests to said database units as addressable channels of said independent addressing space, obtaining data from said physical data storage in accordance with a most recent reassignment of said database units and switching said data processing units between said virtual partitions to assign data processing capacity dynamically to respective virtual partitions.

2. The data access system of claim 1, wherein said switching network comprises an interconnection of switching units.

3. The data access system of claim 1, wherein each database unit is independently accessible as a respective network channel.

4. The data access system of claim 1, further comprising a hashing unit for carrying out a hashing process on data and wherein data is assigned to respective database units via a result of said hashing process.

5. The data access system of claim 4, wherein data is assigned in the form of records having a primary key and at least one secondary keys, and wherein the hashing process is carried out on said primary key.

6. The data access system of claim 5, configured with at least one router to tabulate a relationship between a secondary key and said hashed primary key, wherein said tabulated relationship, and a search query based on a respective secondary key are relatable via said router to said primary key.

7. The data access system of claim 5, configured with at least one additional automatically managed internal index table, said internal index table mapping the relationship between a secondary key and said hashed primary key, wherein said internal index table and a search query based on a respective secondary key are relatable to said primary key.

8. The data access system of claim 1, wherein data is replicated at least once over at least two data partitions.

9. The data access system of claim 1, comprising election functionality for dynamically assigning one of said data processing units as a coordinator to arbitrate between conflicting write operations.

10. The data access system of claim 9, wherein said coordinator is configured to signal regularly an indication that said coordinator is continuing as coordinator, and wherein said election functionality is configured to repeat said dynamically assigning when said regular signal ceases.

11. The data access system of claim 10, wherein a write operation interrupted by said dynamic assigning is resumed from a most advanced one of available recoverable positions when said dynamic assigning is concluded.

12. The data access system of claim 9, wherein said coordinator is configured to assign a unique certificate to a record following a record-altering operation, to render versions of said record comparable.

13. The data access system of claim 4, wherein data is assigned in the form of records having at least three keys and wherein each record is assigned a primary address based on said one of the keys and secondary addresses based on remaining ones of said keys.

14. The data access system of claim 13, comprising a resolution unit for resolving secondary addresses into corresponding primary addresses, and using said resolved addresses to find a record defined by a secondary key using a corresponding primary key.

15. The data access system of claim 14, wherein said resolution unit comprises at least one router.

16. The data access system of claim 15, wherein said resolution unit further comprises at least one backup router.

17. The data access system of claim 8, wherein said switching mechanism is configured to reassign data partition versions to remaining ones of said data processing units following a failure of one or more of said data processing units.

18. The data access system of claim 1, wherein each virtual partition is stored on a predetermined number of data processing units, said data processing units are in independent locations, after the failure of a given data processing unit, all data remains accessible.

19. The data access system of claim 18, wherein said predetermined number is at least three.

20. The data access system of claim 19, wherein said number being at least three is an odd number, the data access system polling to obtain a majority from said copied virtual partitions to ensure integrity of said data.

21. The data access system of claim 20, wherein said odd number is at least five.

22. The data access system of claim 1, further comprising a use measurement function for measuring usage by individual customers of said data access system, and a billing functionality for billing said customers based on peak usage of said data system.

23. The data access system of claim 1, further comprising: a use measurement function for measuring usage by individual customers of said data access system, and a billing functionality for billing said customers based on peak usage of said data system.

24. A method of providing a high availability, high scalability data storage and query system for a database comprising database units, the method comprising:
   providing a data query arrangement, providing multiple independent physical data storage locations;
   providing a data storage arrangement separate from said data query arrangement, said data storage arrangement comprising virtual partitions formed from said database units, said virtual partitions being accessible as addressable channels in an addressing space independent of physical data storage;
   decoupling said physical data storage and said virtual partitions by using switched channel networking and creating an intermediate networking structure, wherein said data partitioning is statically mapped to the network channel, and wherein said decoupling data partitions permits reassignment of any given virtual partition between respectively independent locations of said physical data storage while maintaining said accessibility via respective ones of said addressable channels in said independent addressing space; and
   providing a switching system to dynamically connect between said data storage arrangement and said data query arrangement by using a query field of a current query and obtaining from said query field and said data query arrangement one of said addressable channels of said independent addressing space.

25. The method of claim 24, comprising providing said data storage arrangement as a plurality of channels.

26. The method of claim 25, comprising storing each data item as a record and providing copies of any given data record in a predetermined number of said channels.

27. The method of claim 26, wherein said predetermined number is an odd number.

28. The method of claim 27, further comprising polling to obtain a majority from between said odd number of copies to ensure integrity of said data.

29. The method of claim 26, comprising setting a field of said data records as a primary key and hashing said primary key for addressing said channels.

30. The method of claim 29, comprising setting a field of said data records as a secondary key and providing at least one router for correlating between said secondary key and said primary key.

31. The method of claim 25, wherein said channels are publish subscribe channels.

32. The method of claim 24, wherein said data storage arrangement comprises a plurality of data storage units;
   storing data in multiple copies at a plurality of data storage units, and upon detection of failure of any given data storage unit making additional copies from at least one other of said plurality of data storage units of the data that was stored in said given data storage unit prior to failure.

33. The method of claim 32, wherein said data is accessed via queries and wherein a response to a given queries depends on a current state in relation to said data.

34. The method of claim 33, further comprising retaining said current state in the event of a failure of at least one data storage unit by explicit state synchronization between respective data storage units.

35. The method of claim 34, wherein said explicit state synchronization is pull synchronization.

36. The method of claim 34, wherein said explicit state synchronization is push synchronization.

37. The method of claim 24, further comprising measuring usage by customers.

38. The method of claim 37, wherein said usage is measured as peak usage.

39. The method of claim 38 comprising billing said customers based on said peak usage.

40. The method of claim 24, comprising:
   providing dynamic allocation of said data processing resource to incoming queries.

41. The method of claim 40, comprising copying individual data hems to at least two locations in said data storage resource and providing a group address said at least two locations.

42. The method of claim 40, comprising assigning to said data repository a plurality of states, said states being usable to ensure that upon detection of a fault said repository recovers to a state previous to said detection.

43. The data access system of claim 1, wherein said database units comprise data items, each data hem having a primary key, and one or more secondary keys, wherein said primary key defines said virtual partitions and each secondary key is implemented as an additional automatically managed internal index table, said additional automatically managed internal index table being partitioned by the secondary key, said secondary key by said table mapping the relationship between a secondary key and said partitioning primary key.

* * * * *